United States Patent
Krestyannikov et al.

(10) Patent No.: US 10,542,243 B2
(45) Date of Patent: Jan. 21, 2020

(54) METHOD AND SYSTEM OF LIGHT SOURCE ESTIMATION FOR IMAGE PROCESSING

(71) Applicant: Intel Corporation, Santa Clara, CA (US)

(72) Inventors: Evgeny Krestyannikov, Tampere (FI); Dmytro Paliy, Lempaala (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/949,191

(22) Filed: Apr. 10, 2018

(65) Prior Publication Data

US 2019/0045162 A1    Feb. 7, 2019

(51) Int. Cl.
| H04N 9/73 | (2006.01) |
| H04N 5/235 | (2006.01) |
| H04N 9/31 | (2006.01) |
| H04N 9/68 | (2006.01) |

(52) U.S. Cl.
CPC ............ *H04N 9/735* (2013.01); *H04N 5/2351* (2013.01); *H04N 9/3182* (2013.01); *H04N 9/68* (2013.01)

(58) Field of Classification Search
CPC ........ H04N 9/735; H04N 9/3182; H04N 9/68; H04N 5/2351
USPC .................................. 348/333.01–333.08
See application file for complete search history.

(56) References Cited

U.S. PATENT DOCUMENTS

| 9,186,909 B1 | 11/2015 | Paliy | |
| 9,361,537 B2 | 6/2016 | Paliy | |
| 2016/0366386 A1* | 12/2016 | Douady-Pleven | .... G06T 3/4015 |
| 2018/0097992 A1* | 4/2018 | Douady-Pleven | .... G06T 3/4015 |

OTHER PUBLICATIONS

"Principal Component Analysis", Wkipedia; Mar. 18, 2018.
Macadam, D.L., "Visual sensitivities to color differences in daylight", Journal of the Optical Society of America, 32(5):247-274, 1942 (Abstract only provided).
Schubert, E. Fred, "Light-Emitting Diodes", Chapter 17, Cambridge University Press, 2006.

* cited by examiner

*Primary Examiner* — Yogesh K Aggarwal
(74) *Attorney, Agent, or Firm* — Green, Howard & Mughal LLP.

(57) ABSTRACT

A system, article, and method to perform light source estimation for image processing includes measuring a compactness of the distribution of the image data to select a light source.

25 Claims, 20 Drawing Sheets

MEASURE THE COLOR VARIATION OF THE DATA DISTRIBUTION 1122

DETERMINE A COVARIANCE MATRIX FOR THE DATA DISTRIBUTION 1124

↓

DETERMINE THE MAGNITUDES OF A PRINCIPAL AND SECONDARY AXES OF THE DATA DISTRIBUTION 1126

↓

DETERMINE AN INITIAL COMPACTNESS SCORE OF THE DATA DISTRIBUTION 1128

↓

ADJUST THE INITIAL COMPACTNESS VALUE DEPENDING ON PARAMETERS FACTORING THE HUMAN VISUAL SYSTEM 1130

APPLY AN UNCERTAINTY SCALING FACTOR TO THE INITIAL COMPACTNESS SCORE THAT INDICATES A POSITION OF THE DATA DISTRIBUTION RELATIVE TO POSITIONS OF THE ELLIPSES OF THE HUMAN VISUAL SYSTEM 1132

APPLY AN UNCERTAINTY SCALING FACTOR THAT DEPENDS ON THE DISTANCE BETWEEN THE MEAN OF THE DATA DISTRIBUTION AND THE PLANCKIAN AVERAGE CHROMATICTY LOCUS 1134

ADJUST THE INITIAL COMPACTNESS SCORE DEPENDING ON A GENERAL DIRECTION OF THE DATA DISTRIBUTION RELATIVE TO THE MAJOR AXIS OF ELLIPSES OF THE HUMAN VISUAL SYSTEM 1136

ADJUST THE INITIAL COMPACTNESS VALUE DEPENDING ON AN ANGLE OF THE PRINCIPAL AXIS OF THE DATA DISTRIBUTION RELATIVE TO AN ANGLE OF THE PLANCKIAN AVERAGE CHROMATICTY LOCUS 1138

USE THE FINAL COMPACTNESS SCORES TO PROVIDE EACH ILLUMINANT WITH A LIKELIHOOD OF BEING THE TRUE ILLUMINANT 1140

> SELECT THE HIGHEST LIKELIHOOD AS THE ILLUMINANT WITH THE SMALLEST CHROMATICITY VARIATION 1142

> DETERMINE A LIKELIHOOD FOR EACH BLOCK OF AN IMAGE 1144

> FUSE THE LIKELIHOODS FROM ALL BLOCKS OF A SINGLE IMAGE WITH A LIKELIHOOD PER EACH ILLUMINANT SO THAT THE LIKELIHOODS ADD UP TO 1 1146

PROVIDE THE LIKELIHOODS TO CORRECT COLOR ON AN IMAGE 1148

> DETERMINE A FINAL COMPOSITE LSC TABLE BASED AT LEAST IN PART BY USING THE LIKELIHOODS AS WEIGHTS 1150

> PERFORM AWB BY USING THE LIKELIHOODS TO MODIFY THE WHITE POINT 1152

> DETERMINE A COLOR CONVERSION MATRIX BY USING THE LIKELIHOODS 1154

END

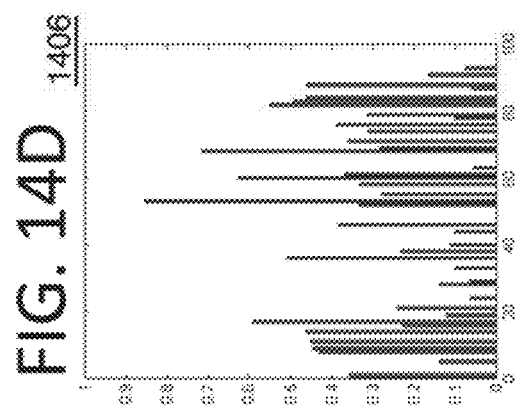
FIG. 14A 1400
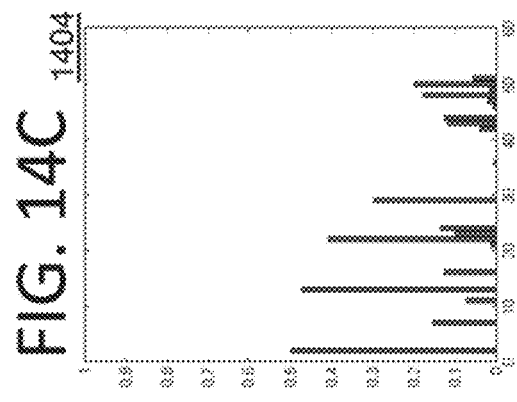
FIG. 14B 1402
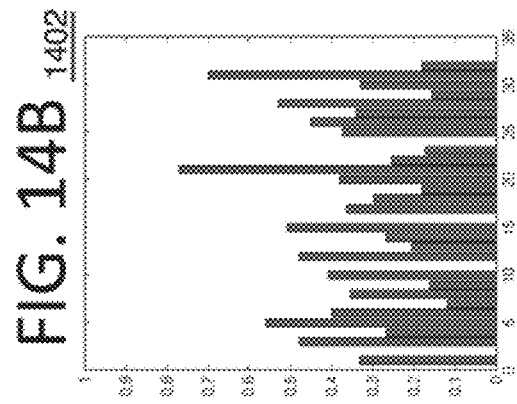
FIG. 14C 1404
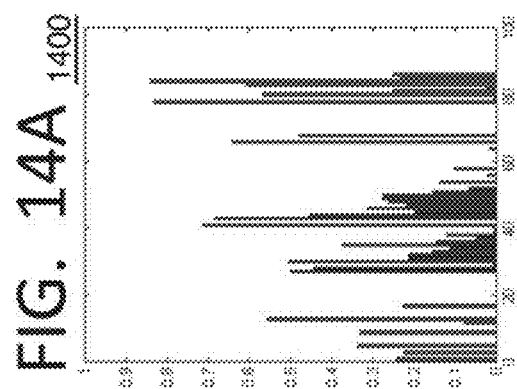
FIG. 14D 1406
FIG. 14E 1408
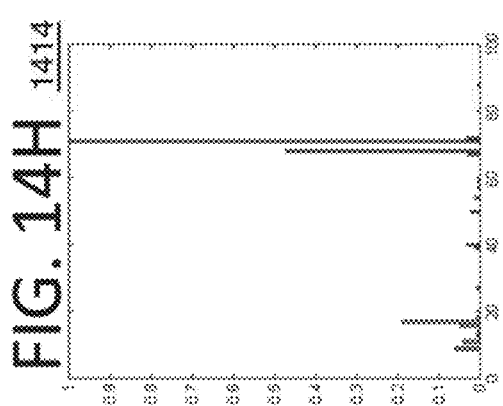
FIG. 14F 1410
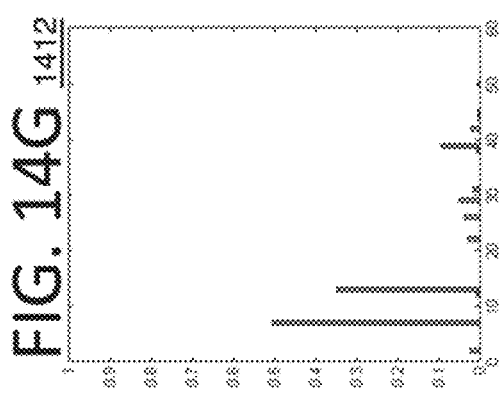
FIG. 14G 1412
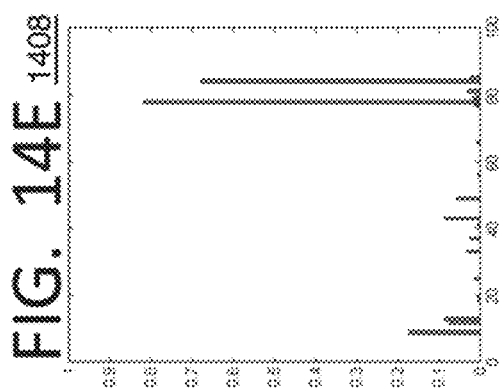
FIG. 14H 1414

FIG. 19    1900
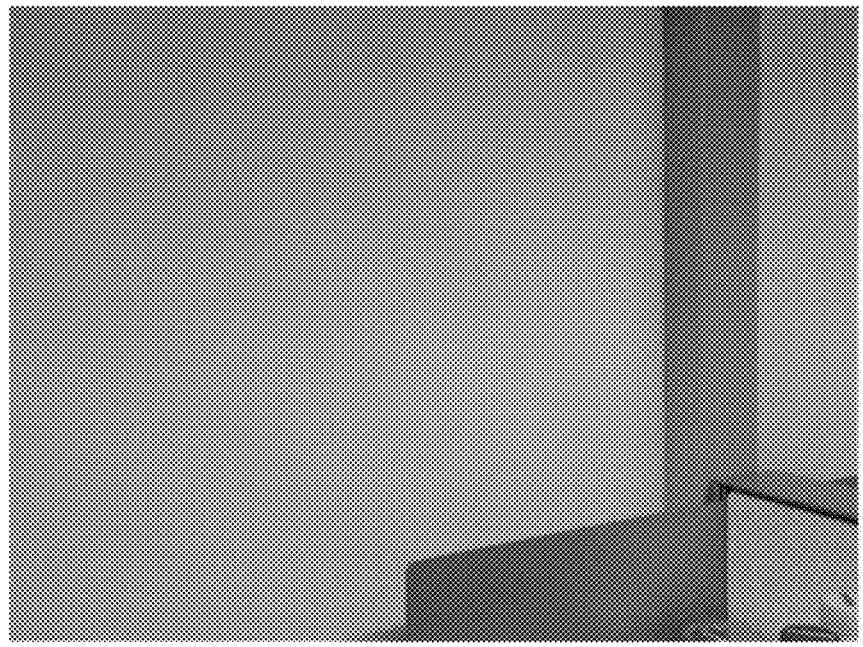
FIG. 20    2000
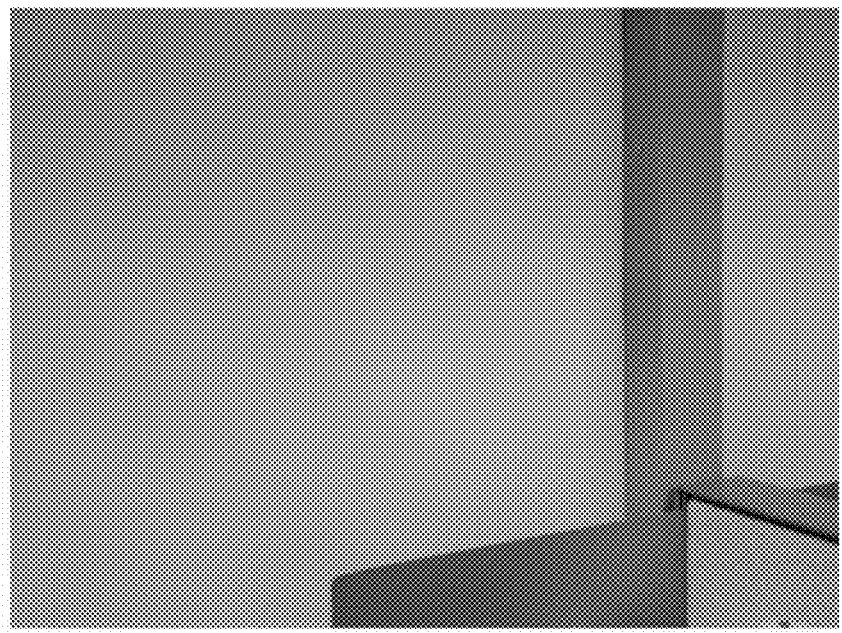

METHOD AND SYSTEM OF LIGHT SOURCE ESTIMATION FOR IMAGE PROCESSING

BACKGROUND

Electronic devices such as smartphones, tablets, and wearable computers are being miniaturized for the user's convenience, which in turn involves the miniaturization of electronic components in such devices. This includes digital cameras capable of producing digital images. While reducing form factors may increase user convenience, it often does so by sacrificing performance or quality.

With respect to digital cameras, slimmer form factors place lenses and filters so close to the camera's sensors that resulting digital images often have color artefacts and discolorations. Primary color restoration techniques to mitigate such effects and restore original colors are the lens shading correction (LSC), automatic white balancing (AWB), and sensor-to-standard color space conversion. Lens shading refers to attenuation of the image where the image is brighter near the center of the image and the edges of the image are darker. This attenuation varies among imaging sensor color channels and is mainly caused by optical system components when the light hits a camera sensor at steep (large) angles due to the short distance between the optics and the sensor. LSC is a technique used to compensate for such signal degradation. Since the amount of attenuation as well as a white point and a color space conversion matrix (CCM) are a function of the incoming light spectrum, the color restoration benefits from knowledge about the true illuminant to sufficiently eliminate the attenuation, calculate white point and color conversion, and in turn provide a good quality image. When the light source is unknown, or mis-estimated (i.e., the wrong light source is selected), the attenuation may not be adequately removed, and other noticeable severe discolorations may be visible on the image.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 11A-11C is a detailed flow chart of a method of light source estimation for image processing according to at least one of the implementations herein;

FIGS. 14A-14D are graphs of light source estimation results with a conventional approach in HSV space;

FIGS. 14E-14H are graphs of light source estimation results according to at least one of the implementations herein;

FIG. 19 is an example image of an indoor scene under CCT 3600K to demonstrate images that have a change in white point from image to image with FIG. 18 and where the estimated light source is not available for automatic white balancing according to the implementations herein;

FIG. 20 is an example image of an indoor scene under CCT 3600K to demonstrate images that have a change in white point from image to image with FIG. 18 and where the correct estimated light source is provided for automatic white balancing according to at least one of the implementations herein;

DETAILED DESCRIPTION

Figure 1:
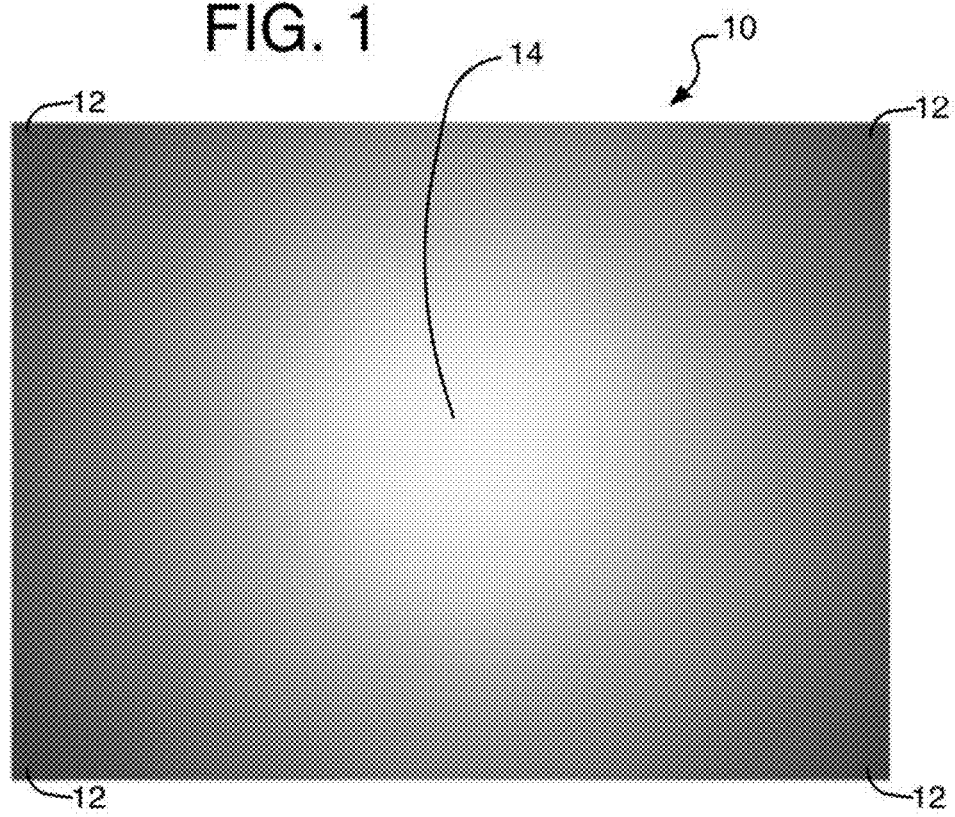
FIG. 1 is an illustration of an image with light attenuation.

One or more implementations are now described with reference to the enclosed figures. While specific configurations and arrangements are discussed, this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video cameras, video game panels or consoles, set top boxes, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of light source estimation for image processing.

A multi-function electronic device that can capture images such as a smartphone, mobile phone, tablet, laptop, and so forth with a mobile camera module may often have a form factor with dimensions sized to easily fit in a palm of an average hand of a user. In such cases, the small electronic device may have a depth so small it may be measured in millimeters (mm). For instance, conventional smartphones may easily have a representative depth of 7.6 mm or thinner. When a device of such narrow depth incorporates an image capture module, such as a digital camera, it necessarily decreases a distance between camera optics and an image sensor. The decreased distance causes light to strike the image sensor at steep angles, such as concentrating light towards a center of the image sensor and causing unequal attenuation resulting in attenuating light towards the outer edges of the image sensor as shown on the image (or sensor plane) 10 (FIG. 1) produced with a sensor and using a flat test area. The closer the optics is to the sensor, the greater the ray angle and the worse the degradation. The decreased distance between optics and sensor causes light to strike various portions of the image sensor in a non-uniform manner, such as concentrating light towards a center of the image sensor and attenuating light towards the outer edges of the image sensor as shown on the image 10 (FIG. 1) produced with a sensor and using a flat test area. As shown in FIG. 1, corner regions 12 of image 10 are darker than a central region 14 of image 10. This suggests that light attenuation (also referred to as signal attenuation) due to optical lens shading, or vignetting, is greater with respect to corner regions 12 than it is with respect to central region 14.

This attenuation may not be uniform throughout color planes which results in severe color distortions. Specifically, the amount of attenuation, or scale of how much light is attenuated, is different between color channels depending on a light spectrum of the incoming light (light spectrum also may be referred to as a spectral response herein). Attenuation is minimal in the optical center, while increasing with distance from the optical center. However, since a majority of digital imaging sensors are equipped with color filter arrays (CFAs) to reproduce or restore color information in digital images, the sensors will sense and register different color parts of the light spectrum like red, green, and blue on different parts of the image. Hence, in addition to the attenuation being unequal from a center to corners of an image, the attenuation varies in different color channels (sub-areas of the full visible spectrum for example) after a sensor registers the light. As a result, such attenuation varies in different color channels, which results in severe color artefacts and degradation when the image is reconstructed improperly.

Figure 2:
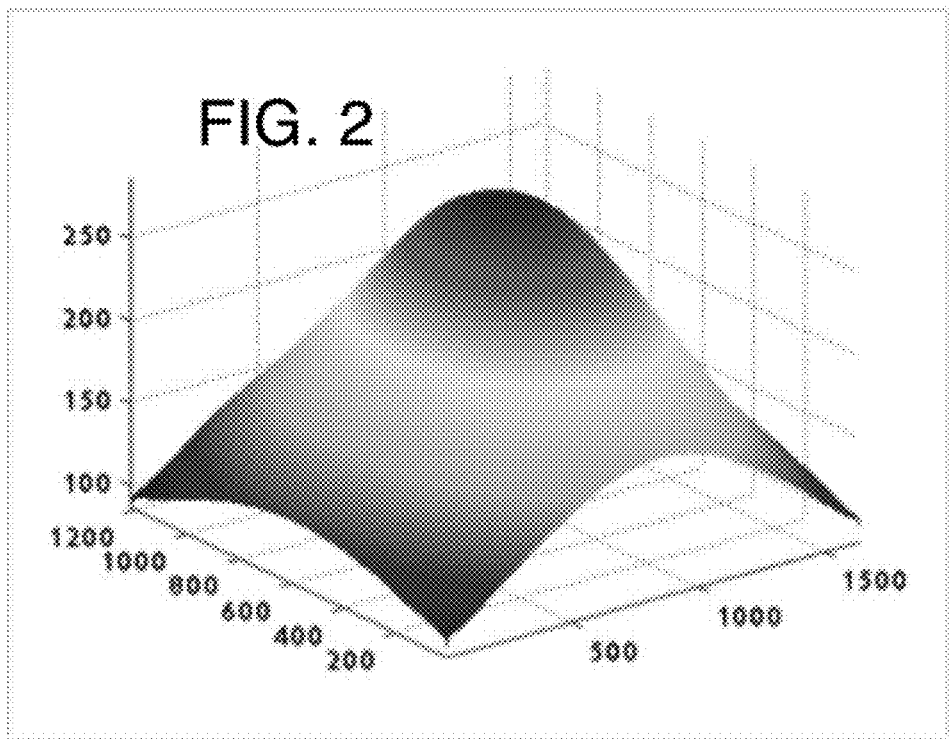
FIG. 2 is a chart showing the intensity variation for light attenuation of the image of FIG. 1.

In addition to the geometry (e.g. chief ray angle) of a module configuration and the light spectrum of the incoming light, the attenuation also may vary based on the module configuration's optics (e.g., lenses, IR-cut-off (infra-red) filter, sensor design, and so forth), and potentially other factors. Typical results are digital images that are brighter in the center and darker near the edges as mentioned, as well as artificial colors and other color artefacts or discolorations, and attenuation with respect to the original scene. FIG. 2 shows one color plane from FIG. 1 where the vertical axis is brightness, and the base shows pixel coordinates. The light is brightest in the center and reduces significantly toward the outer corners while color distortions (not shown) can occur non-uniformly throughout the image. Thus, an objective property of the optical system, the estimate of the illuminant used to light a captured scene, can cause degradations depending on the accuracy of the estimate. This can be exploited by improving the estimation to know what the light source is, and in turn to improve applications like AWB, CCM, and others that rely on the light source estimation.

To correct for such non-uniformity, an image capture device may implement various lens shading correction (LSC) algorithms to compensate. An LSC algorithm may utilize one or more correction LSC tables (also referred to herein as correction grids) with correlated color temperature (CCT) factors associated with them to perform such correction. Once an LSC table is formed (or more accurately selected among pre-stored LSC tables), it is applied to pre-processed image data to make the corrections before the data is provided to an encoder or before the image is displayed for example. Previous solutions were based on use of distributions of hue and saturation values (global statistics analysis). Other solutions use block-based local or global color deviation analysis (local or non-local statistics analysis) which is disclosed in U.S. Pat. No. 9,361,537, issued Jun. 7, 2016, and U.S. Pat. No. 9,186,909, issued Nov. 17, 2015, both of which are incorporated herein in their entireties for all purposes.

The conventional correction processes used to select the LSC tables, however, still are too inaccurate. Particularly, primary color restoration algorithms in an image processing pipeline, namely the lens shading correction (LSC) and automatic white balancing (AWB) that estimates a white point for an image rely on an estimation of the light source (also referred to interchangeably herein as illuminant) providing the light to the scene that was captured by the camera sensors and is being corrected. In addition, a subsequent color conversion may be performed to convert sensor RGB image data to other standard color spaces such as IEC sRGB, ITU-R BT.2100, and so forth that are used to render the images on a display. Such color conversion also relies on the light source estimate.

An illuminant can be viewed as a mathematically tractable and technically reproducible light source used for colorimetric calculations. Among an index of standard illuminants maintained by an International Commission on Illumination (CIE) are for example A illuminant that represents an incandescent filament lamp, F illuminant representing different types of fluorescent lighting, or D series of illuminants constructed for natural daylight, to name a few examples. The light source is conventionally selected by determining a correlated color temperature (CCT) of an image (or part of an image such as a block of pixels), and then selecting the light source, and in turn a set of LSC conversion tables associated with the light source as well as a white point and a color conversion matrix, all depending on the CCT.

The selection of the wrong light source can cause unequal attenuation, and in turn visible color distortions, because the color shading changes as a function of illumination spectrum. Therefore, proper estimation of the correct light source becomes very important for successful elimination of color shading artefacts and subsequent white balancing and color conversions of the reconstructed image. Some light sources, however, have very close CCTs such that the light sources can be mistaken for each other even though the light sources may emit light with very different light spectrums. Such a mistake can affect the color shading in an undesirable way when the wrong light source is selected to provide the LSC tables for an image captured with a different light source.

Figure 3:
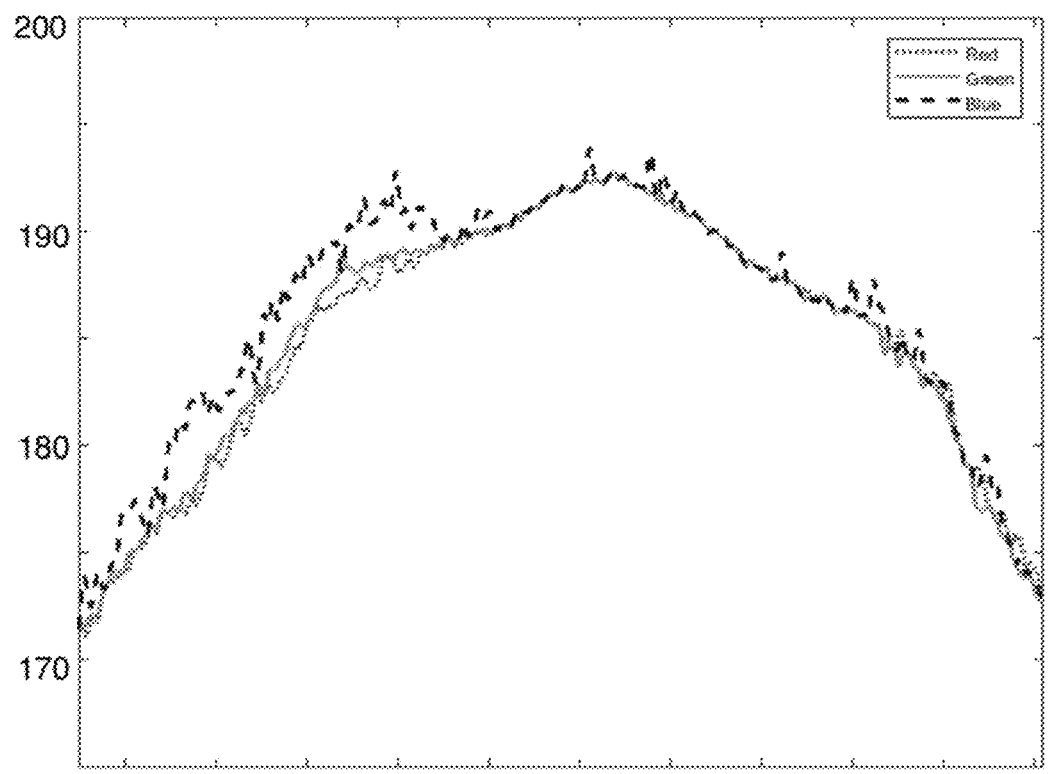
FIG. 3 is a graph showing pixel intensity values for different color channels and corrected by using the correct light source estimate to perform lens shading correction.
Figure 4:
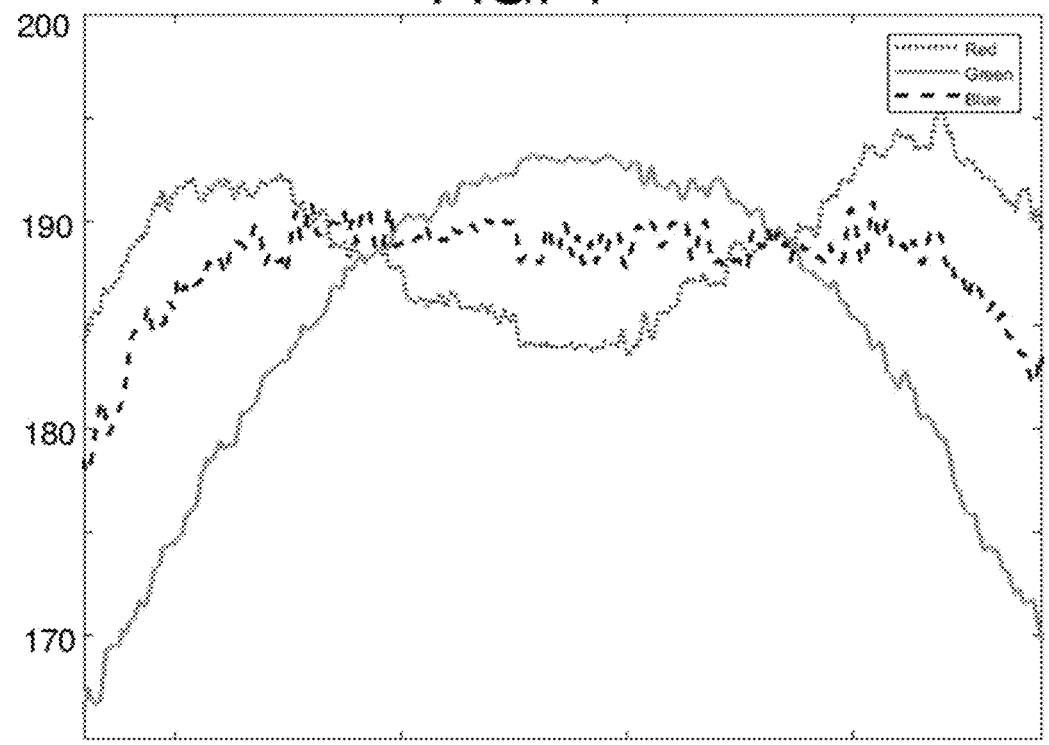
FIG. 4 is a graph showing pixel intensity values for different color channels and corrected by using the wrong light source estimate to perform lens shading correction.

Referring to FIGS. 3-4 for example, pixel values of restored images are shown on graphs 300 and 400 and show the pixel values along a diagonal of a flat achromatic image from the upper left corner to the bottom right corner for example to show the maximum extent of any remaining attenuation. The vertical axis is digital light intensity values, and the horizontal axis is pixel position on the image. The images were actually formed using incandescent light, and graph 300 shows the results of an image restored using the LSC tables of the correct incandescent light source. Graph 400 shows the result when the LSC tables of the wrong (fluorescent) light source are used. A similar result occurs when the shading is not corrected at all. It can be observed that the differences between color channels, and in turn the ratios between the color channels are somewhat uniform on graph 300 (indicating a flat grey/achromatic scene on the image) with the correct light illuminant, but the differences in color channels, and therefore color ratios, vary widely from corner to corner of the image represented by the graph 400. This results in a colorful image with different colors in different parts of the image. In other words, since the color ratios between red and green, and blue and green, samples in the restored image are not constant along the pixel locations (along the horizontal axis), the reconstructed image will appear with spatially varying color artefacts that do not accurately correspond to the original scene in the image.

These difficulties are made worse when the images provide complex scenes with small flat areas providing a small data set as the basis for light source estimation, or when the actual light source illuminating a scene is not represented by the lens shading tables.

As to automatic white balancing (AWB), this correction procedure involves solving a color constancy problem that is applied after spatial color correction for accurate reproduction of colors in the reconstructed image. White balancing mimics the unique ability of the human visual system to perceive the appearance of the objects with the same color under different illumination conditions. The AWB algorithm seeks to find a chromaticity coordinates that define the color neutral "white" object on the image or the white point. Once the chromaticity of the light source is estimated, different color channels of the input image are corrected with the white balancing gains so to keep the appearance of the white in the output image constant. Since the AWB uses LSC corrected image data, however, this may result in discolorations when the lens shading correction was based on the wrong light source.

In addition, the white point on monochromatic and unicolored scenes often are not identifiable with conventional color constancy approaches and may produce large color cast for different frames in dynamic scenes. One approach to solving this uses temporal scene stabilization which can effectively stabilize the white balancing errors under one illuminant by using a prior established over a number of images. See, for example U.S. patent application Ser. No. 15/857,455, filed Dec. 28, 2017, and published as US 2019-0045161, on Feb. 7, 2019, and which is incorporated entirely herein for all purposes. This solution, however, often is not capable of correctly distinguishing large unicolored objects in the presence of illumination change when the light source changes from image to image such as when a camera is first capturing images outside and is then brought inside during the same ongoing video sequence. A robust and accurate light source estimation algorithm is often needed to track and properly handle the change in illumination conditions.

As to the color conversion, camera output after white balancing correction is usually specific to a given sensor. Conversion from sensor RGB color space to target sRGB space may be performed by using a 3×3 color conversion matrix (CCM) to get a consistent and sensor independent output result. Accurate color conversion matrices are usually optimally predetermined for different light sources and are dynamically selected in the imaging device based on the current output from an AWB algorithm. Specifically, color conversion uses a CCT of a white point estimate provided by the AWB algorithm to select a precomputed color conversion matrix. This approach relies on the assumption that chromaticity of illumination given by the AWB algorithm is accurate and may assist to explicitly determine the choice of the final CCM. In practice, however, this rarely holds true since many light sources with completely different spectral response characteristics and different CCMs may have a similar chromaticity of the white point. It is possible, though not necessarily always true, that the two light sources (for instance A and F12) could have a similar chromaticity of the white point and very similar correlated color temperature, and therefore could be mistaken for each other despite having very different light spectrums and in turn, very different CCMs. The incorrect selection of the light source from the AWB, and in turn incorrect CCM, can amplify the color reproduction errors and decrease the overall perceived image quality. Thus, when illuminants that are in close proximity to each other in terms of the CCT cannot be accurately and robustly distinguished from each other, this may limit the accurate color reproduction and cause temporal instabilities and color errors for dynamic scenes.

Figure 5:
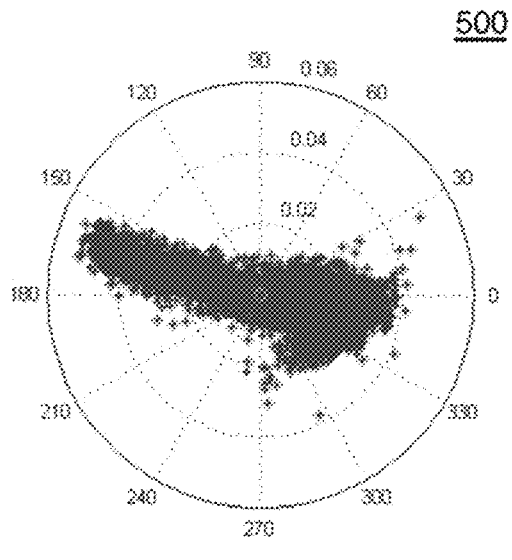
FIG. 5 is a polar chart showing a data distribution in hue saturation value (HSV) color space of an image corrected with an incorrect light source estimate.
Figure 6:
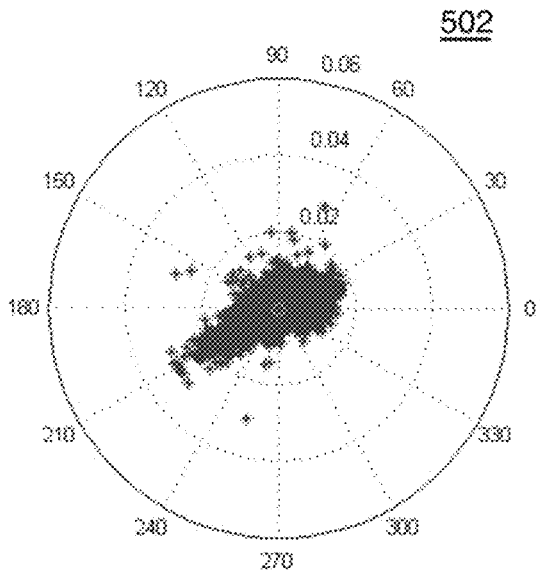
FIG. 6 is a polar chart showing a data distribution in HSV color space of an image corrected with the correct light source estimate.

To resolve these issues, the method and system herein include a computational approach for light source estimation (LSE) that exploits the measurable properties of the optical imaging system and knowledge of objective constraints on the illuminant. Particularly, sensor RGB output may be obtained and that may include uncorrected spatial data attenuation. This image data is modified by predetermined lens shading correction tables that each represent a different illuminant of a finite set of available illuminants providing lens shading correction tables for image processing. The modified image data forms data distributions for each available illuminant that is then mapped on a color chromaticity space to measure the color variations (or color distribution) of the data distribution for each illuminant on the chromaticity space. To accomplish this, the method calculates color variations directly in the color chromaticity space by applying a linear transformation to the image data in order to find (or measure) which of the light sources has a correction grid (or light shading correction table) that results in the smallest color variation (or color distribution or data distribution) and is referred to herein as the compactness of the data distribution. This is shown on FIGS. 5-6, where a polar graph 500 of a color chromaticity space shows a relatively large color distribution due to an incorrect illuminant being used for lens shading correction, while a polar graph 600 shows a compact color distribution likely to be formed from use of the correct lens shading correction table, and in turn selection of the correct illuminant. The graphs are in HSV space where radius is saturation and the angle measures hue. Thus, it has been found that smaller color deviation (as shown in FIG. 6), as a parameter of such distribution, gives larger probability of a tested light source to be a true light source.

These operations also factor the human visual system. As explained below, it has been found that data distributions that generally extend parallel to Macadam's ellipses, and in turn generally parallel to an average Planckian chromaticity locus, are more likely to be the true illuminants. The linear transformation of the color distribution may be performed by determining a covariance matrix for the data distribution including the use of singular-value decomposition or principal component analysis (PCA) decomposition to determine covariance coefficients, and then determining the eigenvalues of the covariance matrix to determine the magnitude of principal and secondary axes of the data distributions. The eigenvalues are then used to determine a single magnitude of the data distribution, and in turn a likelihood that the illuminant used to form the data distribution is the true light source. This may be performed for each data distribution so that each illuminant has a probability or likelihood of being the true illuminant.

Figure 7:
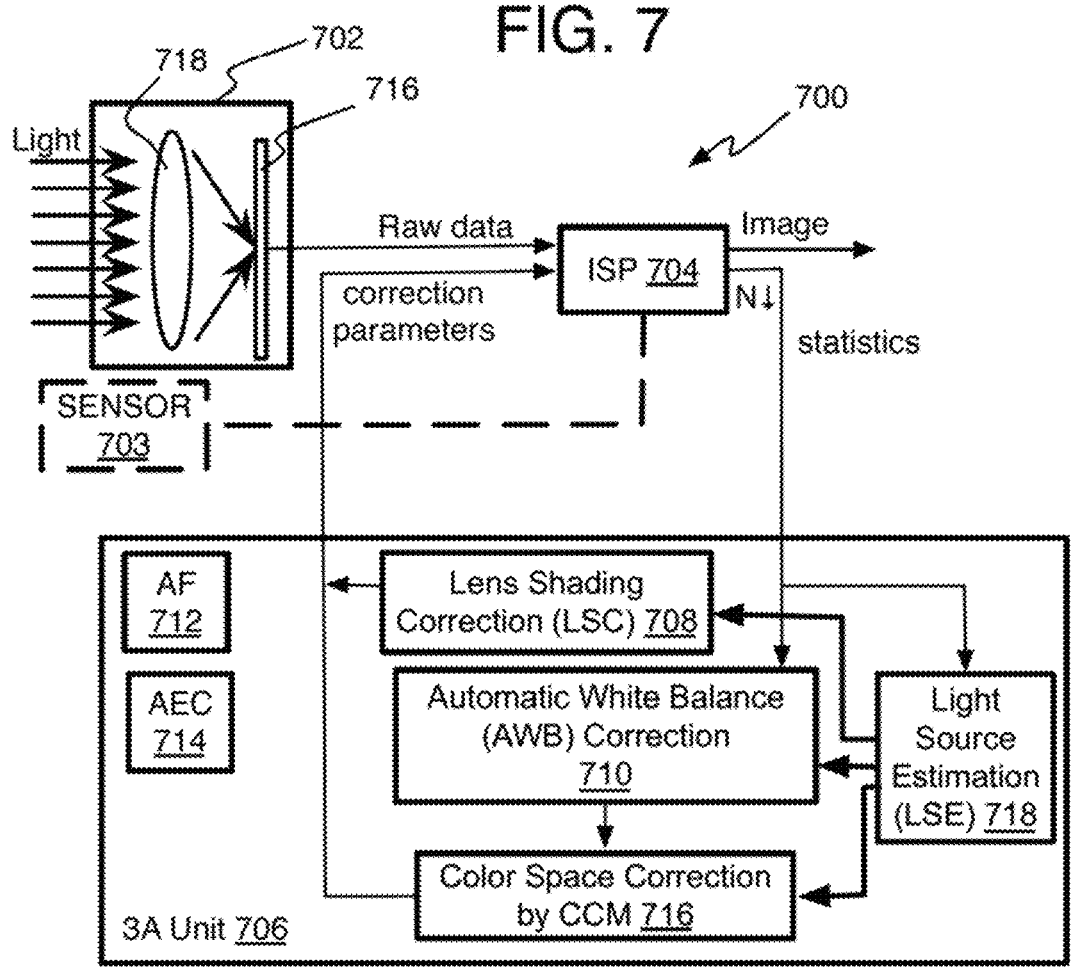
FIG. 7 is a schematic diagram of an image processing device to perform light source estimation according to at least one of the implementations herein.

Referring to FIG. 7, an image processing device 700 that may perform the light source estimation methods performed herein may include a camera module 702 to capture images and provide raw image data for each image, one or more image signal processors (ISP) 704 to perform the processing for the image processing device, and a 3A unit 706 that performs automatic camera adjustments as well as image data modifications to improve the quality of the resulting images.

The camera module 702 receives light from a scene lit by an illuminant. By one form explained below, a sensor 703 may be provided to identify the actual illuminant used to light the scene. By other forms, the illuminant must be estimated. The light passes through camera optics 718 and is then focused on imaging sensors 716. In the present example, each optic may be paired with a corresponding image sensor 716. Each of the image sensors 716 may be based on any of a variety of technologies for capturing an image of a scene, including and not limited to charge-coupled device (CCD) semiconductor technology. Each of the optics 718 may be made of one or more lenses, mirrors, prisms, shutters, filters, etc. employed to convey images of a scene and to at least partly define the field of view of corresponding ones of the image sensors 716. The image sensors 716 and the optics 718 (whatever their quantity) are positioned and oriented relative to each other in a manner intended to provide each image sensor and optics pair with a field of view that overlaps field(s) of view of one or more of the other image sensor and optics pairs.

Digital output from sensor 716 may be in the form of raw data and is then processed by the image signal processor (ISP) 704. Output from the ISP 704 is an image data of enhanced quality in a human perceivable format.

Color information is one key factor contributing to image quality that depends on the scene and illumination specific parameters. Color correction parameters may be estimated dynamically during camera run-time capturing a scene and processed by the 3A unit 706 for example. The color correction parameters may then be provided to the ISP 704 for color correction and reproduction of the images. The 3A unit 706 may have a lens shading correction (LSC) unit 708, automatic white balancing (AWB) unit 710, an autofocus (AF) unit 712, and an automatic exposure control (AEC) unit 714. A color conversion matric (CCM) unit 715 also may be provided, and may or may not be considered a part of the 3A unit 706, to convert the color space of the processed images into a standard color space used for rendering or display of the images. The CCM unit 716 may use image data already corrected by the LSC unit 708 and the AWB unit 710 but this is not necessarily always so with the light source estimation (LSE) technique used herein and as explained below. A light source estimation unit 718 performs the LSE methods or techniques mentioned herein.

Conventionally, color correction was performed in sequence, such that data is first corrected against lens shading to remove non-uniformity in colors, which is given than as an input to white-balance correction, after which sensor colors are converted to standard color space colors though a CCM. Light source estimation was a part of the LSC unit and only affected decisions for lens shading adaptation. Now in device 700, however, the light source estimation (LSE) unit 718 performs the operations mentioned above to generate the likelihoods (or probabilities) that each or an individual illuminant is the true illuminant, and then may pass the likelihoods separately to the light shading correction (LSC) unit 708, the AWB unit 710, and/or the CCM unit 716 to assist and facilitate the calculation of corresponding output correction parameters, and specifically to respectively generate a final composite LSC correction grid (or table), white point, and/or color conversion matrix.

For the LSC unit 708, the LSE method herein significantly simplifies the LSC process. Once the LSE likelihoods are formed for each illuminant, the LSC table associated with the highest likelihood is selected as the final LSC table. By another option, the likelihoods may be used as weights for the LSC tables to form a single weighted average final composite LSC table to modify the image data for display. By yet another possible option, the LSE likelihoods may be considered initial likelihoods used to replace or refine a CCT probability $P_{CCT}$ (discussed below) of each candidate LSC table to determine block-based AWB-adjusted and HSV-space errors and confidence values to form the composite final LSC tables. Yet another implementation may be to refine CCT probability $P_{CCT}$ from a previous iteration as output from an LSE unit to improve stability or accuracy. The details are explained below.

The AWB unit 710 may receive input including image data with spatial color invariances corrected by application of LSC tables and other camera characterization information to estimate illumination chromaticities for color constancy in single frames or temporally over dynamic scenes in multiple frames. When the AWB is applied to image data that is adjusted based on the correct lens shading correction tables, the resulting image will have less attenuation and discoloration. Additionally, and specifically relating to the AWB, accurate knowledge of the correct scene illuminant as provided by the LSE unit may help to stabilize and improve the performance of AWB operations for difficult dynamic scenes that include a change in illumination conditions and/or with ambiguous image content, such as monochromatic scenes dominated by some unicolored objects indistinguishable by AWB such as white, light brown or light blue, and not identifiable for conventional AWB algorithms.

In addition, although the estimated white point does not uniquely define a certain illuminant, the auxiliary information about the true illuminant used for image capture may significantly simplify the white point estimation task. In other words, the AWB operation may use the indication of the correct illuminant from the lens shading correction tables for example to limit the search range for the white point in the chromaticity space by ignoring AWB results that are too distant from the true illuminant. For example, say a light source estimation algorithm has detected a fluorescent F11 light source with correlated color temperature (CCT) 3840K, while the AWB has found the white point with respective CCT 3200K. This information may be sufficient to conclude that the AWB has probably found an incorrect white point, and the AWB should stabilize the white point with respect to the F11 light source instead (e.g., shift the white point estimate to a higher CCT in the chromaticity space).

With a more accurate AWB determination, the CCM unit 716 will more accurately select the CCM for color conversion as well since a correlated color temperature of the accurate white point may be used to calculate a CCM specific for a given scene as a weighted average of CCMs pre-calculated for a set of different light sources. When the light source estimation method is sufficiently accurate, the CCM determination could also be decoupled from the AWB by obtaining the color space conversion directly from the LSC unit by determining the correct CCM by using the LSC table likelihoods Thus, the present method is not related to mere chromaticity of illumination estimation tasks as performed in an automatic white balancing for example and that may often produce ambiguous light source detections. Instead, the use of the measurable properties including measurement of the compactness of a data distribution in the chromaticity space and while factoring the human visual system (HVS) provides significantly more accurate results. Thus, the present method significantly improves the quality of color restoration and color reproduction in an image reconstruction pipeline through better performance and improved accuracy of lens shading, automatic white balancing, and color conversion algorithms.

Particularly, the method increases robustness and accuracy of the conventional light source estimation algorithm and extends the use of light source estimation to assist the automatic white balancing and color correction. The computation complexity of the proposed solution is lower than a complexity of the conventional solution as it performs the measurement in sensor chromaticity space without the need to perform a data conversion to HSV space as is used in conventional LSC. When the present method is used instead of conventional LSC, this may provide capacity for further improvements, e.g., faster and more robust adaptation to a new light source. The LSE method herein, when combined with a temporal AWB stabilization approach, leads to an increase in robustness of white point estimation and significant decrease in color constancy errors in the presence of illumination conditions changes. The method also allows for decoupling of CCM from AWB results by permitting CCM operations to use the likelihoods from the present light source estimation method directly. The use of reliable light source information provided by this method yields more accurate color space conversion, and improvements in perceived color image quality. By another option, the present LSE method may be used to refine the probabilities from the conventional CCT-based LSC selection operations, thereby resulting in increased accuracy of the illuminant selection and in turn, the quality of the images.

Figure 8:
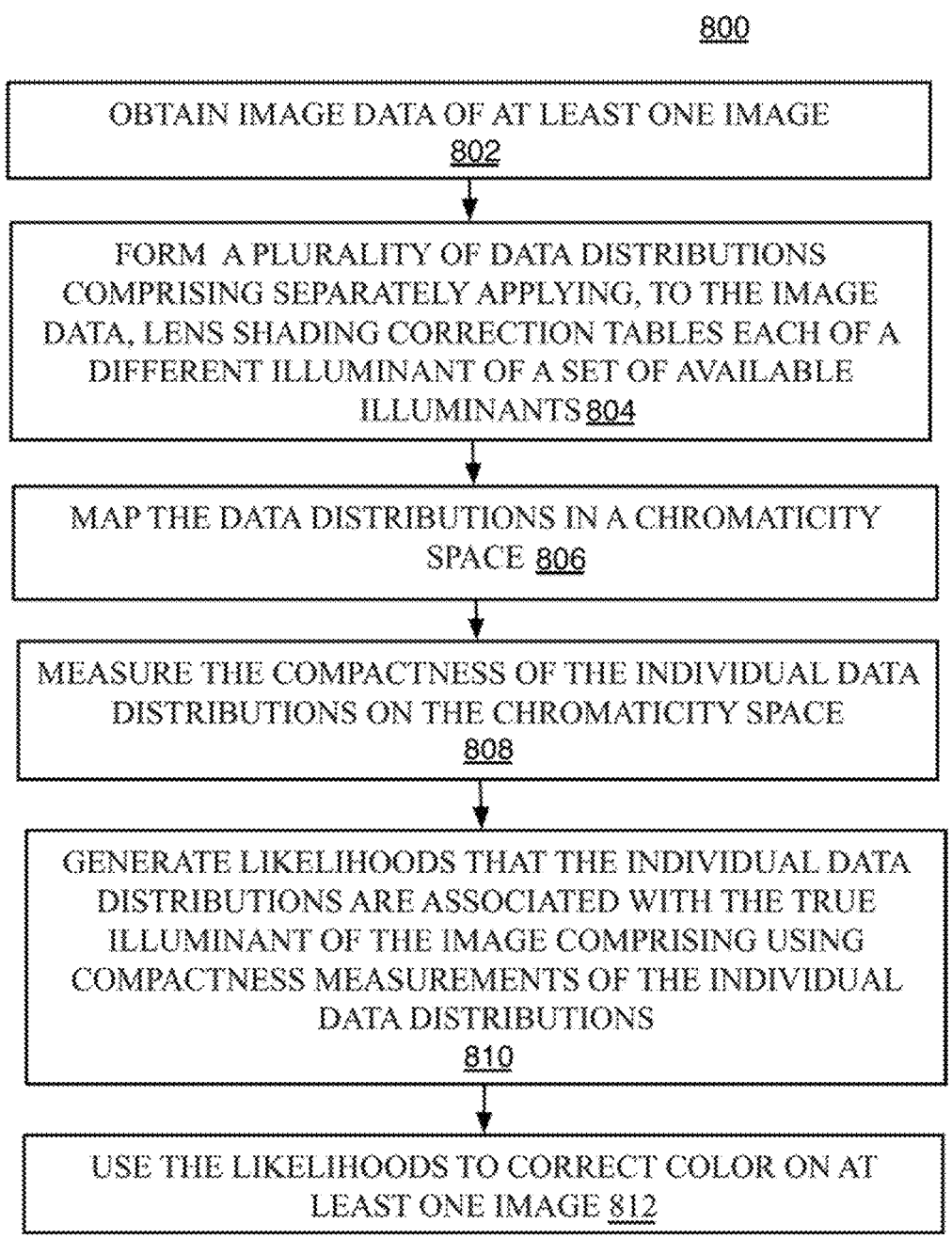
FIG. 8 is a flow chart of a method of light source estimation for image processing according to at least one of the implementations herein.

Referring to FIG. 8, an example process 800 is a computer-implemented method of light source estimation for image processing. In the illustrated implementation, process 800 may include one or more operations, functions or actions as illustrated by one or more of operations 802 to 810 numbered evenly. By way of non-limiting example, process 800 may be described herein with reference to example image processing devices 700, 900, 1100, and 2100 of FIGS. 7, 9, 11 and 21 respectively, and where relevant.

Process 800 may include "obtain image data of at least one image" 802. This may include obtaining data of an entire image or data of a smaller division of the image, such as a block to determine the correct lens shading correction table block-by-block. By another form, the image data may be divided into blocks in a later operation as described below. By one form, the image may be divided into 6×4 for 24 blocks as one example. The image data also may be obtained with sufficient pre-processing to perform the light source estimation. By one form, the image data is in the form of a statistics grid providing blue/green and red/green color ratios in the RGB color space for pixel locations being analyzed in a block or entire image. This may be provided to match the units of the chromaticity space that will be used. Thus, other units or statistics could be used instead depending on the chromaticity space. By one form, the image data is initially provided with black-level correction but no lens shading correction is applied yet. The image data also may be downsampled.

Process 800 may include "form a plurality of separate data distributions comprising separately applying, to the image data, lens shading correction tables each of a different illuminant of a set of available illuminants" 804. Here, the system uses predetermined lens shading correction tables (the "objective constraints" mentioned above) from a library formed during a characterization phase, each for a different illuminant and indexed according to corresponding correlating color temperatures (CCTs). The LSC tables may be applied to the image data depending on an initial correlated color temperature (CCT). Specifically, this initial CCT may be determined in a number of different ways, such as using the CCT determined from AWB from a previous frame, analyzing the image data, and others described below. Going forward, the system may use a subset of LSC tables, and in turn illuminants that have CCTs sufficiently close to the initial CCT. The LSC tables adjusts the chroma values of the image data to form a number of color data distributions, one for each available illuminant, and when block-based analysis is used, the image may be divided into blocks, if not performed already, and each block may have its own data distribution. The set of available illuminants may be finite and may not include LSC tables for all possible illuminants, and may merely include a small set of the most used illuminants including both daylight and indoor lights such as incandescent, fluorescent, LED and so forth.

Process 800 may include "map the data distributions to a chromaticity space" 806, so that each of the data distributions are then mapped to a chromaticity space map or graph. This may include converting the RGB data into the units of the chromaticity space such as R/G and B/G ratios for example as mentioned above and if not performed already. Each data distribution is then analyzed separately. As mentioned, each data distribution could represent an entire image or smaller division of an image such as a block.

Process 800 may include "measure the compactness of the individual data distributions on the chromaticity space" 808. By one approach, a principal component analysis (PCA) technique may be used to apply a linear transformation that treats the data distribution on a 2-D plane and may include determining the principal components of a data distribution by projecting the data distribution to a principal (or major) axis and a minor axis of the data distribution. The eigenvalues and/or eigenvectors of the covariance matrix may be determined for the data distribution, and the eigenvalues may be used as the magnitudes of the two principal axes defined by corresponding eigenvectors. By one example approach, the magnitudes, and in turn a compactness score, may be computed as the L1 norm of the vector of eigenvalues. In another implementation data compactness can be computed as the L2 norm of the vector of eigenvalues. Other combinations of the eigenvalues or eigenvectors could be used to determine the data compactness as well.

By one approach, the compactness score is an initial value that is then adjusted to reflect the human visual system. It has been found that the data distributions that are closer in position and orientation to the color of blackbody radiator, also known as Planckian chromaticity locus, can generally provide more accurate quantification of color differences, while highly chromatic objects positioned far away from chromaticity locus is more ambiguous and difficult to quantify. Thus, an uncertainty scaling factor may be applied to the initial compactness score to reflect the position of the data distribution relative to the Planckian average chromaticity locus. More specifically, the scaling factor favors a data distribution as the mean of a data distribution is closer to a Planckian average chromaticity locus; and vice versa, penalizes the data distributions whose mean is shifted further away from the Planckian average chromaticity locus.

Likewise, this also, or alternatively, may include having the system adjust the initial compactness score depending on the angle of the principal axis of the data distribution relative to the angle of a major axis of the MacAdam's ellipses in the chromaticity space. Particularly, the smaller the angle between the principal axis of a data distribution and the angle of a tangent at the nearest point of the Planckian average chromaticity locus, which represents the MacAdam's ellipses, indicates that the data distribution is more likely to be the true illuminant. The result is a compactness score adjusted by factoring the human visual system. By one form, the smallest compactness score indicates the data distribution most likely to be associated with the true illuminant.

Process 800 may include "generate likelihoods that the individual data distributions are associated with the true illuminant of the image comprising using compactness measurements of the individual data distributions" 810. Here, a likelihood is provided for each LSC table, and in turn a corresponding illuminant. By one form, the resulting compactness score for a data distribution is the likelihood for the LSC table. By another form, each likelihood is used to form a further probability value that the corresponding LSC table represents the true illuminant. For example, when an image is divided into blocks, and each block is analyzed separately and has a likelihood (or compactness score), the similar likelihoods are grouped or combined (or fused), such as averaged, to form a single likelihood for an illuminant. By this example, the likelihoods for each illuminant then may be normalized so that all of the likelihoods for an image are proportional to the total and add up to 1.

Figure 9:
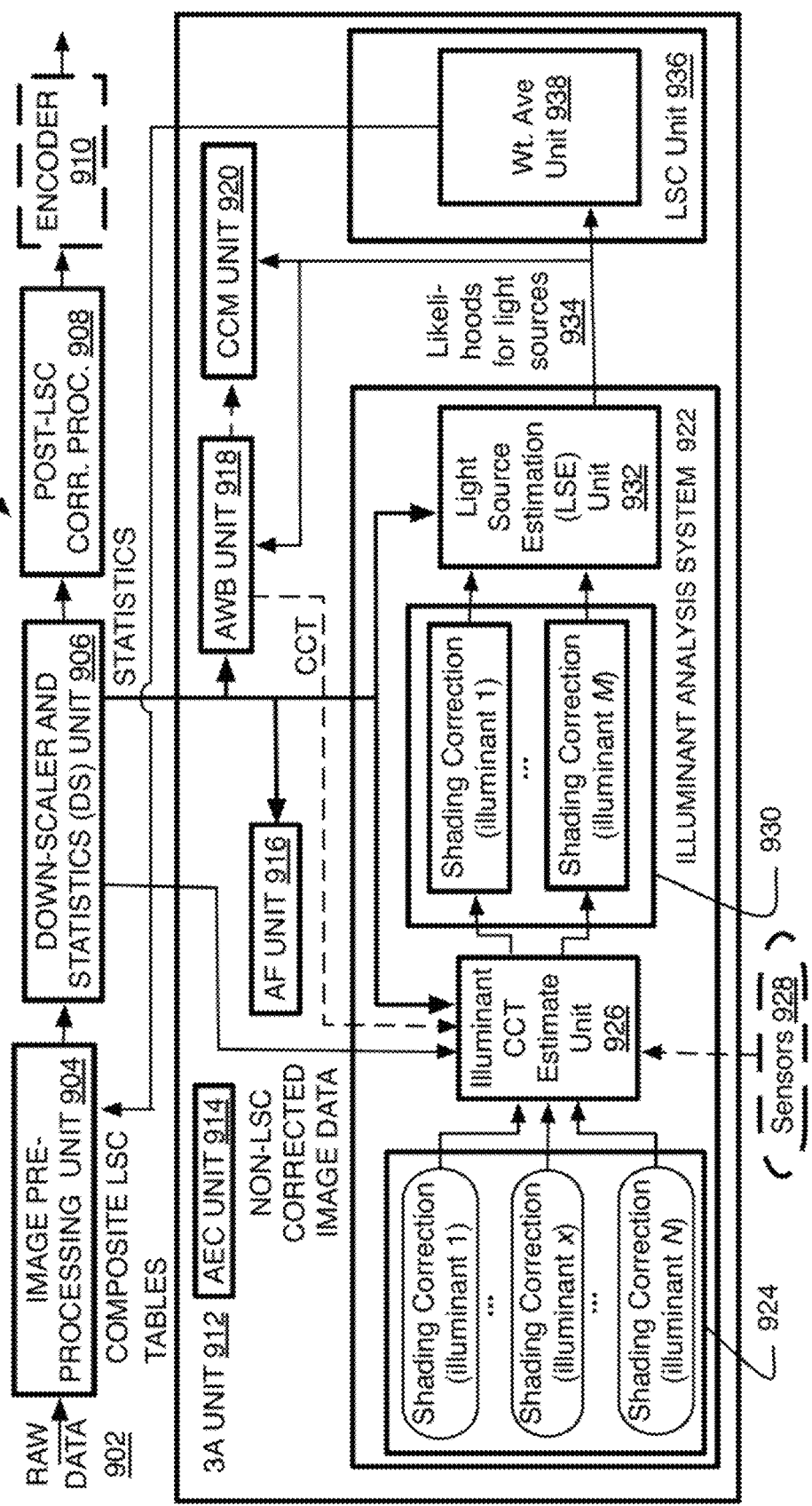
FIG. 9 is a schematic diagram of an image processing device to perform 3A operations according to at least one of the implementations herein.

Process 800 may include "use the likelihoods to correct color on at least one image" 812. By one option, as shown in FIGS. 7 and 9, the LSC unit, AWB unit, and the CCM unit may receive the likelihoods of the correct light source independently. The LSC unit may use the likelihoods to find a weighted average final or composite LSC table to be used to correct the color shading artefacts in the reconstructed images. Similarly, the CCM operations may use the likelihoods to determine a weighted average CCM. The AWB unit may use the likelihoods to adjust a scene illumination prior that serves as a temporal invariant. Otherwise, the likelihoods may be used to determine if the AWB white point is based on a CCT sufficiently close to the CCT of the highest likelihood for example, and if not, the AWB may adjust the white point. By other options, the AWB may use the CCT determined by using the likelihoods to reduce the range of a search for the white point CCT. By yet another option, the LSC unit could treat the likelihoods as initial likelihoods to modify or replace a probability CCT ($P_{CCT}$), which is then used to form AWB-corrected HSV-space errors and confidence values to form the composite LSC table. Yet another implementation may be to refine the CCT probability $P_{CCT}$ from a previous iteration as output from the LSE unit to improve stability or accuracy. The details are provided below.

Referring now to FIG. 9, an image processing device or system 900 may be used to perform the light source estimation methods described herein. The device 900 may have an image pre-processing unit 904, a down-scaler and statistics (DS) unit 906, a post-3A correction processing unit 908, an encoder 910 and a 3A unit 912. The 3A unit 912 may have an automatic exposure correction (AEC) unit 914, an auto-focus (AF) unit 916, an automatic white balance (AWB) unit 918, a color conversion matrix (CCM) unit 920, an illuminant analysis system 922 with an LSC table library 924 and a light source estimation unit 932 among other components, and a lens shading correction (LSC) unit 936.

The pre-processing unit 904 receives raw image data 902 from a camera module as described with FIG. 7 for example, and may perform black-level correction on the raw image data, upscale a composite LSC correction grid (or table) received from the lens shading correction (LSC) unit 936 described below, and upscales the grid to the size of image data, and multiplied in a point-wise manner.

The downscaler and statistics (DS) unit 906 will then use the LSC corrected image data to generate statistics for 3A, which comprises LSC corrected, AF statistics for auto-focus, and black-level corrected raw statistics. Thus, the DS unit 906 may provide both the LSC corrected data for 3A corrections, and the black-level (or non-LSC) corrected raw data to an illuminant CCT estimate unit 926 to determine an initial CCT to reduce the number of candidate LSC tables to a subset for analysis and light source estimation. In systems that do not provide the black-level-adjusted data to the 3A unit 912, the LSC corrected data from the downscaler 906 may be reverted before it is used in lens shading estimation. The DS unit 906 also is provided to downscale the raw data stream (or raw image information) from the camera module. The DS unit 906 also analyzes the downscaled image data to form statistics that may be used by the 3A unit 912. At the very least, the pre-processed image data should already be processed for black-level correction before light source estimation operations may begin. Hence, if the DS unit 906 assumes only one type of statistics as an output, which is LSC-corrected, then this correction shall be reverted and used as input to illuminant analysis system 922 as mentioned. Other 3A units may use LSC-corrected or AF statistics, or both. The preprocessed image may be a single image, or a sequence of images, such as from a video sequence. The preprocessed image may be received by the illuminant analysis system 922 in real-time, or in non-real time from a memory unit. Implementations are not limited in this context. Note that pre-processing and post-processing discussed herein are relative to the 3A unit analysis including the light source estimation described herein.

The illuminant analysis system 922 may determine or obtain an initial CCT in order to reduce the number of illuminants, and in turn LSC tables for analysis, and thus to reduce the computational load. This subset of LSC tables is then provided to an initial shading correction unit 930 that separately applies the subset of LSC tables to the non-LSC corrected image data to form a set of alternative data sets. These are provided to the light source estimation unit 932 to form data distributions that are mapped to a chromaticity space and measured as described herein to determine the compactness scores or likelihoods that a data distribution, and in turn a corresponding LSC table, is associated with a true illuminant.

Specifically, a characterization phase is performed during design and assembly of the image processing device 900 before a correction phase. In the characterization phase, LSC tables 924 are created to cover most CCT value ranges for commonly used light illuminants such as an incandescent 'A' illuminant, a fluorescent F11 or F12 illuminant, a daylight D55 or D65 illuminant, and so forth. The LSC tables 924 are stored in a memory, such as a persistent storage, forming a library for later use during the estimation and correction phases.

The correction phase may be performed in real-time, or run-time execution during use of the image processing device 900 and when data is streamed from the camera module. During the correction phase, the 3A unit 912 via the DS unit 906 may analyze the content from the streamed image data, and supplementary metadata. Examples of metadata may include, without limitation, auto-focus values, optionally a CCT estimate of the current image, time values, and so forth. The relevant data mentioned above is provided to the 3A unit 912 by the DS unit 906.

By one form, the illuminant analysis system 922 obtains an LSC table for each represented illuminant in the LSC table library 924 to be candidate LSC tables for light source estimation analysis. By another approach, however, the number of illuminants is reduced to a subset of candidate LSC tables for analysis to reduce the computational load on the processor(s) and to reduce delay. An illuminant CCT estimate unit 926 may select the subset of LSC tables by determining an initial CCT. This may be accomplished in a number of ways. By one form, the CCT established by the AWB unit 918 for a previous frame is used. By another form, the CCT may be obtained from metadata provided with the image data. By yet another form, illuminant CCT estimate unit 926 computes the initial CCT using the non-LSC image data and received statistics by using known methods such as computing a CCT probability for each LSC table. Those LSC tables of illuminants with a CCT sufficiently close (or probability sufficiently high) to the initial CCT are selected for inclusion in the subset for analysis. Other details for selecting candidate LSC tables is explained below. By yet another option, sensors 928, such as ambient light sensor, for instance, may be used to detect the true illuminant and provide the CCT for the detected illuminant.

The initial shading correction unit 930 then applies each of the LSC tables from the subset to image data of an image to form alternative data sets each modified by a different LSC table, and in turn for a different illuminant. This modified image data is then provided to a light source estimate (LSE) unit 932 to derive likelihoods for each LSC table.

Figure 9A:
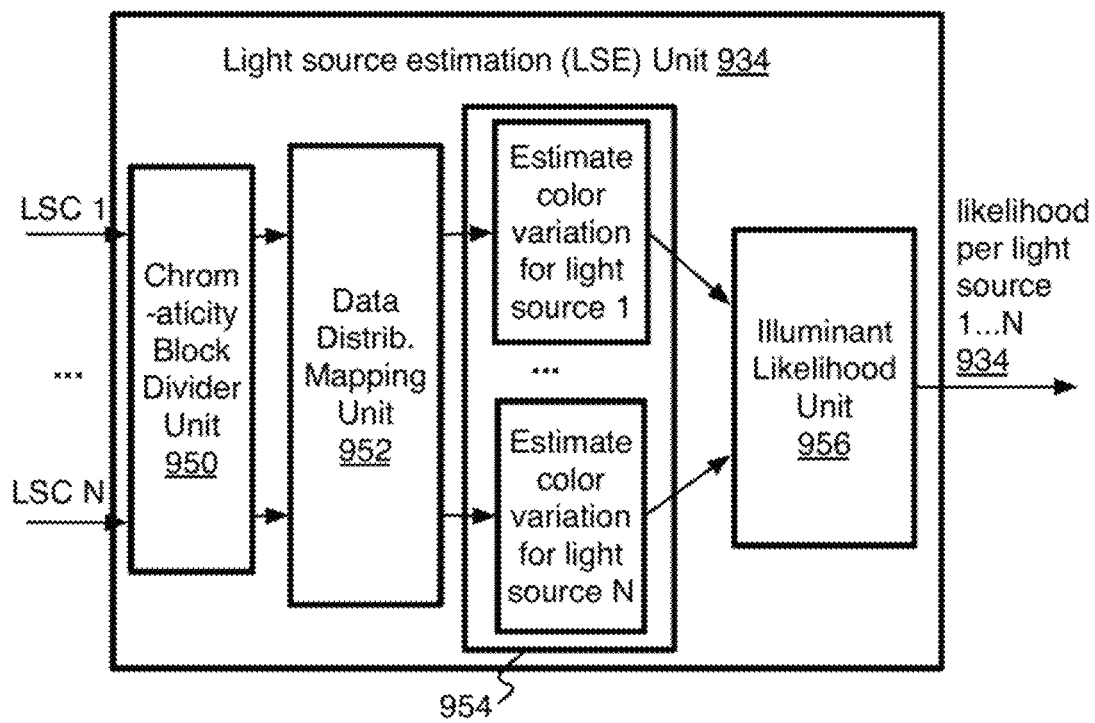
FIG. 9A is a schematic diagram of a light source estimation of the device of FIG. 9 and that performs light source estimation according to at least one of the implementations herein.

Referring to FIG. 9A, the LSE unit 932 performs the light source estimation operations described herein and may have a chromaticity block divider unit 950 that divides each image, and in turn the modified image data of each alternative set of data, into blocks, and the light source estimation is then performed on individual or each block, block by block. Thus, the LSE unit 932 has a data distribution mapping unit 952 that maps each data set as a data distribution on a chromaticity graph (or color space or chromaticity space) including converting units of the data distribution into units of the graph such as R/G and B/G color ratios. A color variation estimation unit 954 measures the data distributions, and provides measurements, in the form of likelihoods for each data distribution.

Figure 9B:
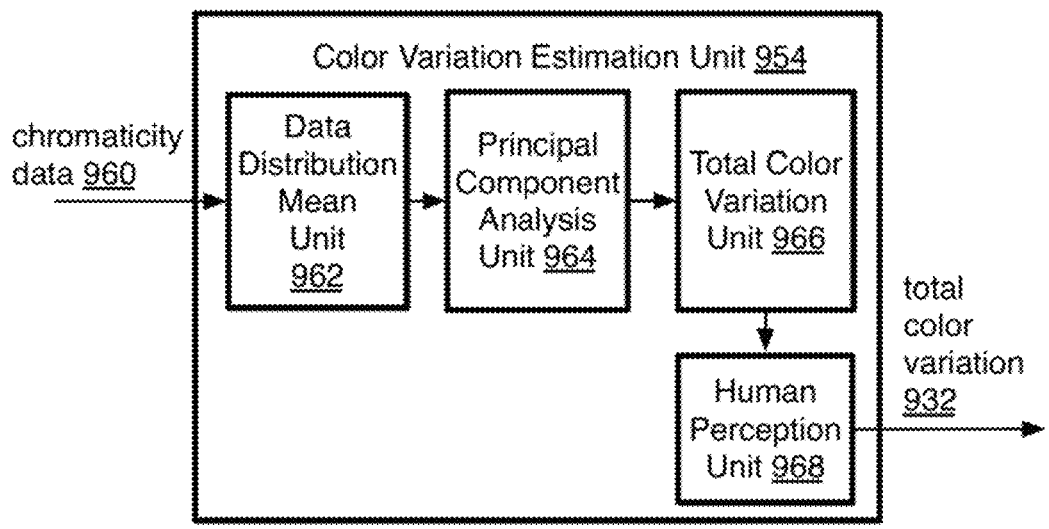
FIG. 9B is a schematic diagram of a color variation estimation unit of the light source estimation unit of FIG. 9A.

Referring to FIG. 9B, specifically, the color variation estimation unit 952 may receive the chromaticity data (in the form of the data distributions) and may have a data distribution mean unit 962 to determine the mean of the data distribution; a principal component analysis (PCA) unit 964 that performs a linear transformation technique. This may involve establishing a covariance matrix for a data distribution and that establishing two principal axes of the data distribution. A total color variation unit 966 then determines eigenvalues and eigenvectors from the covariance matrix to represent the magnitude and orientation of the data distribution, and provides an initial measurement of the data distribution, and by one form as a norm of the vector of eigenvalues, thereby providing an initial compactness score of the data distribution. A human perception unit 968 then may be used to favor data distribution shapes and/or positions that more closely resemble the properties of the human visual system. Thus, the human perception unit 968 may adjust the compactness score by factoring both the position of the data distribution in the chromaticity space, and the orientation of the data distribution relative to the orientation of the MacAdam's ellipses. By one form, the position and orientation of the data distribution are compared with respect to the Planckian average chromaticity locus which represents the orientation of MacAdam's ellipses in chromaticity space. This analysis is repeated for each data distribution (or each block and each illuminant represented in the subset of LSC tables), and the result is a compactness score of each data distribution analyzed, and per block. Likelihoods are assigned based on the relative difference in the compactness scores for light sources being tested. That is, blocks with more compact data distribution are assigned with a higher likelihood of being a true light source, while more broadly distributed data chromaticities get lower likelihood.

These likelihoods are provided to an illuminant likelihood unit 956 that finalizes the likelihoods to provide a single likelihood for each illuminant and for the entire image. Thus, this may involve fusing the likelihoods from all of the blocks of an image into a final likelihood per each illuminant so that the likelihoods sum up to 1 by one example. The fusing is performed by first selecting a subset of blocks representing relatively homogeneous regions in the image (that is with smallest compactness scores), summing up the likelihoods for those blocks, and further normalizing the result so that the likelihoods for all the light sources add up to 1, and then creating a vector of likelihoods for each known light source associated with a shading correction table with one likelihood per illuminant.

Returning to FIG. 9, the likelihoods 934 are then provided to the other applications to adjust color of an image. Thus, the likelihoods 934 are provided to the LSC unit 936, the AWB unit 918, and the CCM unit 920 for example. By this example, the LSC unit 936 may have a weighted average unit 938 to weight the shading correction grids according to the illuminant likelihoods. This composite or weighted lens shading correction grid then may be provided to the pre-processing unit 904 to correct colors on one or more images.

The AWB unit 918 may receive the likelihoods and determine or adjust final white point calculation depending on the likelihoods. This may include the computation of a time invariant prior that uses the light source information for such a computation and may be made more accurate when the light source likelihoods are obtained from the LSE unit 932.

The CCM unit 920, also as described in detail below, converts the image data into standard color spaces for rendering and may obtain the CCT being used from an image from the AWB unit 918 or directly from the light source estimation unit 932 for example. By another form, as with the AWB unit, the CCM unit may receive the likelihoods so that the CCM unit can use the likelihoods as weights to form a weighted average CCM that should be used to convert the image data for rendering. These and other options are explained in detail below with processes 11 and 13A-13C.

The post-processing unit 908 then may perform tasks such as further noise reduction, pixel linearization, resolution reduction, Bayer demosaic, and/or further post-processing vignette elimination when needed as well as other tasks. An encoder 910 also may be provided to compress the data for transmission in a bit stream or for storage on computer readable media.

Figure 10:
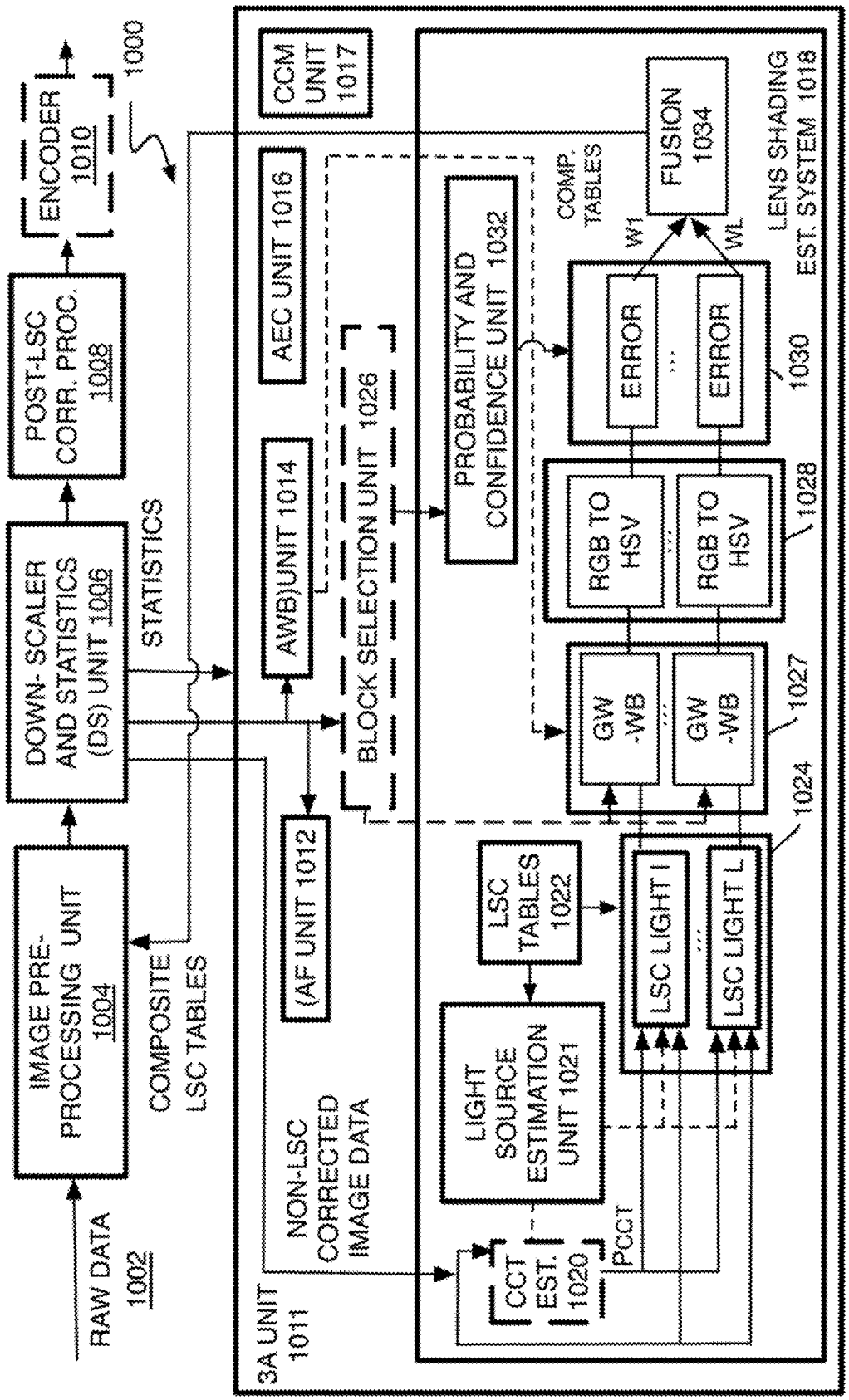
FIG. 10 is a schematic diagram of an alternative example image processing device to perform 3A operations including LSC with light source estimation according to at least one of the implementations herein.

Referring to FIG. 10, an alternative image capture device or system 1000 to process captured images and apply the light source estimation method described herein is described and adds a different light source estimation technique to the methods used in U.S. Pat. Nos. 9,361,537 and 9,186,909, cited above. Much of the description of image processing device 900 applies to the device 1000 here, such that the description will not be repeated when redundant.

A 3A unit 1011 on the device 1000 may have an LSC estimation unit 1018 that may use a correlated color temperature (CCT) estimate unit 1020 in conjunction with a light source estimation (LSE) unit 1021 to determine which of a set of LSC tables 1022 are to be used for lens shading color correction for a current image. By other examples, the light source estimation unit 1021 may replace the use of the CCT estimate unit 1020. The light source estimation unit is the same or similar to LSE unit 718 of FIG. 7 or LSE unit 950 of FIG. 9A. The characterization phase and library of LSC tables 1022 is already described above with device 900. During the correction phase, the light source estimation unit 1021 alone or together with the CCT estimate unit 1020 may be used to estimate one or more original light source types and initial selection of candidate LSC tables. The 3A unit 1011 also may include a block selection unit 1026 to use blocks or block clusters that represent smooth areas of an image.

An initial (or candidate) LSC table unit 1024 may be provided to identify the tables initially selected by the light estimation unit 1021 and/or CCT estimate unit 1020, and for further processing. By one approach, a GW-WB module 1027, RGB to HSV convertor 1028, and error unit 1030 processes block data of input statistics, and outputs an error value for each block (and for each illuminant). Separately, a probability and confidence unit 1032 also receives the block data from the block selection unit 1026 and calculates a confidence value for each block by one example. The error unit 1030 then uses the error values and corresponding confidence values to generate a weight (w1 to wL) for each initial (or candidate) LSC table assigned to each illuminant. A fusion unit 1034 then adjusts the initial LSC table data by using the weight for the table, and then summing (or fusing) all of the LSC tables from all of the illuminants into a single composite LSC table. The fusion unit 1034 may then output one final LSC table to the pre-processing unit 1036 to adjust the pre-processed image data for lens shading color correction.

The light source estimation unit 1021, however, provides a number of alternative ways to determine the correct LSC tables to be used. As mentioned, the LSE unit 1021 may adjust the results of the CCT estimate from CCT estimate unit 1020. By this approach, the initial candidate LSC tables may be selected by first analyzing image content and by calculating a probability CCT ($P_{CCT}$) of presence of illuminant from a characterization database using sub-sampled input image data. Thus, a respective CCT probability of presence may be calculated for each of a plurality of LSC tables, and the set of candidate LSC tables to be used going forward may comprise each LSC table among the plurality for which the probability of presence is greater than zero. Each chosen LSC table may correspond to a different respective illuminant.

Once the $P_{CCT}$s are determined, however, they may be adjusted by the compactness scores or probabilities from the light estimation unit 1021 for example. By one form, the LSE unit 1021 probabilities may simply replace the $P_{CCT}$s when desired, such as in a high quality mode which could be selected by a user, or may be averaged or some other combination could be used. Otherwise, the $P_{CCT}$s and the probabilities of the LSE unit 1021 could be combined by weighting the likelihoods of different illuminants to add up to 1 and then applying those likelihoods or weights to the $P_{CCT}$s. $P_{CCT}$ computation may use LSE results from previous frames in a video sequence, or by using external sensors, such as an ambient light sensor, for instance. The fusion unit 1034 then may provide the LSC tables to the image pre-processing unit 1004 and other 3A units as described elsewhere herein.

Figure 11A:
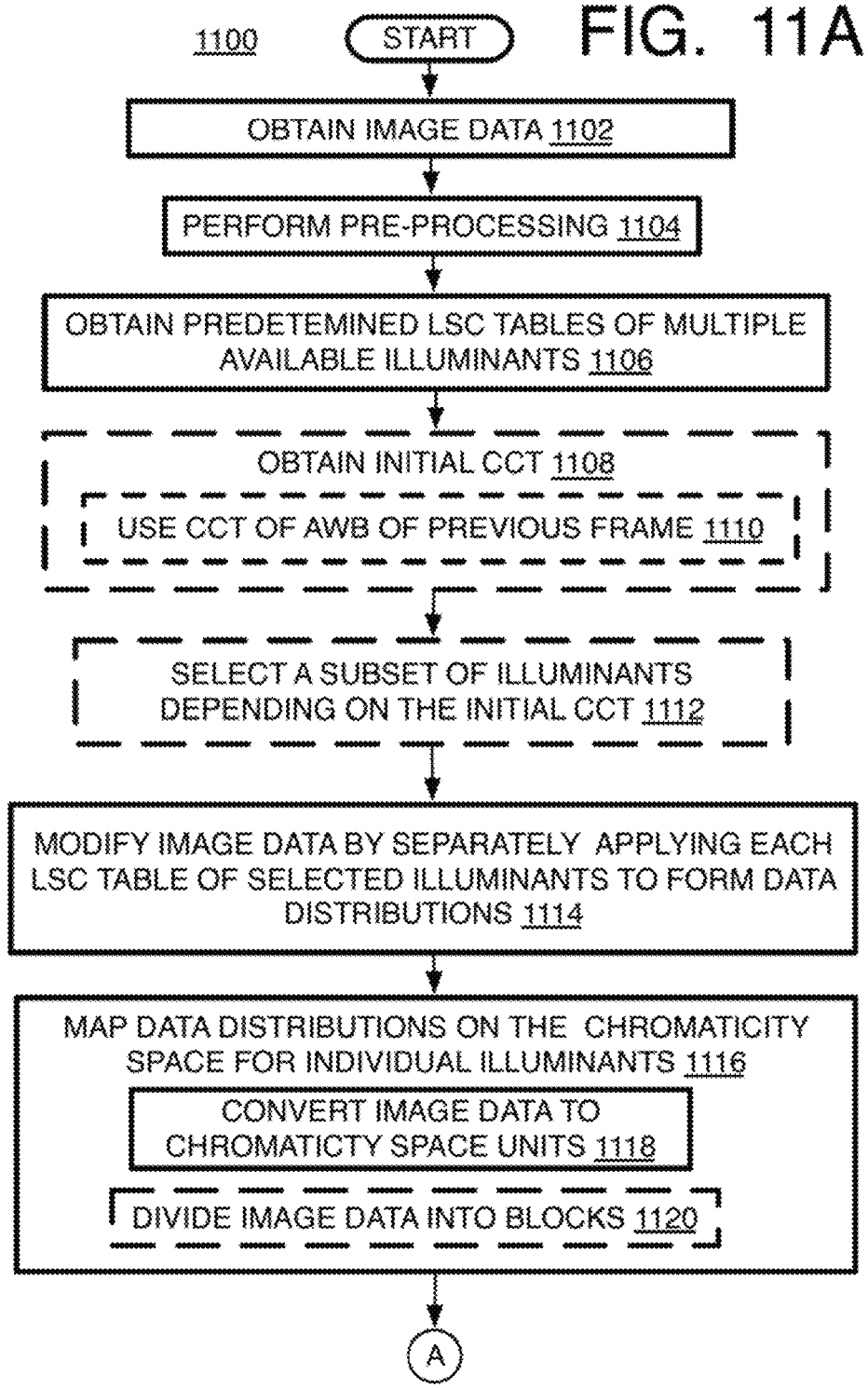

Referring now to FIGS. 11A-11B, a more detailed light source estimation process 1100 for image processing is arranged in accordance with at least some implementations of the present disclosure. In the illustrated implementation, process 1100 may include one or more operations, functions or actions as illustrated by one or more of operations 1102 to 1146 numbered evenly. By way of non-limiting example, process 800 will be described herein with reference to example image capture devices 700, 900, 1100, and 2100 of FIGS. 7, 9, 11, and 21 respectively, and where relevant.

Process 1100 may include "obtain image data" 1102, and as explained above may include obtaining raw image data streamed from a camera module or other image capture module. The camera module, such as camera module 902 (FIG. 9), may be part of a single image capture device that includes the disclosed lens shading color correction system, or it may be remote from the disclosed system.

Process 1100 may include "perform pre-processing" 1104. This may include black-level and lens shading corrections as well as other operations as described above. As mentioned above, by one approach, the non-LSC corrected image data is provided for the light source estimation processing.

The process 1100 also may then include downscaling the image data, whether as part of the pre-processing or considered to be a separate operation to reduce the amount of image data to a uniform, controllable amount, such as a grid of data (corresponding to pixel locations) to form a 51×39 image for a smartphone for example. Such downscaling may be performed by using standard sampling techniques.

Process 1100 may include "obtain predetermined LSC tables of multiple available illuminants" 1106. This involves obtaining the LSC table data for the illuminants included in a set of available illuminants and from a library of the LSC tables as described above. The tables are generated and saved during a characterization phase before use of the image processing device to process images. Each single LSC table may comprise multiple tables with one table for each imaging sensor color channel being used, and each channel table includes coefficients to compensate signal (image data) attenuation.

As mentioned above, all available illuminants (referred to as all pre-characterized illuminants) may be analyzed for light source estimation. A more efficient way, however, is to reduce the number of illuminants, and in turn LSC tables to analyze. For this approach, the process 1100 may optionally include "obtain initial CCT" 1108. The initial CCT may be obtained or computed in a number of different ways. By one form, this operation may include "use CCT of AWB of previous frame" 1110, and this option is being used in the present example. It will be understood, however, that the CCT may be an estimate CCT obtained in metadata received with the image data. Otherwise, the initial CCT may be computed by using the non-LSC corrected image data and the statics generated for the image by known methods.

The process 1100 may include "select a subset of illuminants depending on the initial CCT" 1112, where here the initial CCT is compared to the CCTs indexing the LSC tables. Those CCTs sufficiently close to the initial CCT are the selected illuminants and their corresponding LSC tables for the subset for analysis. These are the light sources that are most likely to occur in the image.

Now during a correction phase, process 1100 may include "modify image data by separately applying each LSC table of selected illuminants to form data distributions" 1114. Thus, this involves applying the lens shading correction grid (or table) of the candidate light source to the raw non-LSC corrected RGB image data. This may be repeated for each available LSC table corresponding to a different illuminant in the subset. By one form, this operation modifies the RGB pixel values included in the image data. By one approach, the image data already may be in the form of a downscaled statistics grid and may already be in terms of color chromaticities R/G and B/G, and the application of the LSC tables occurs on the statistics grid to modify the ratios.

Figure 12A:
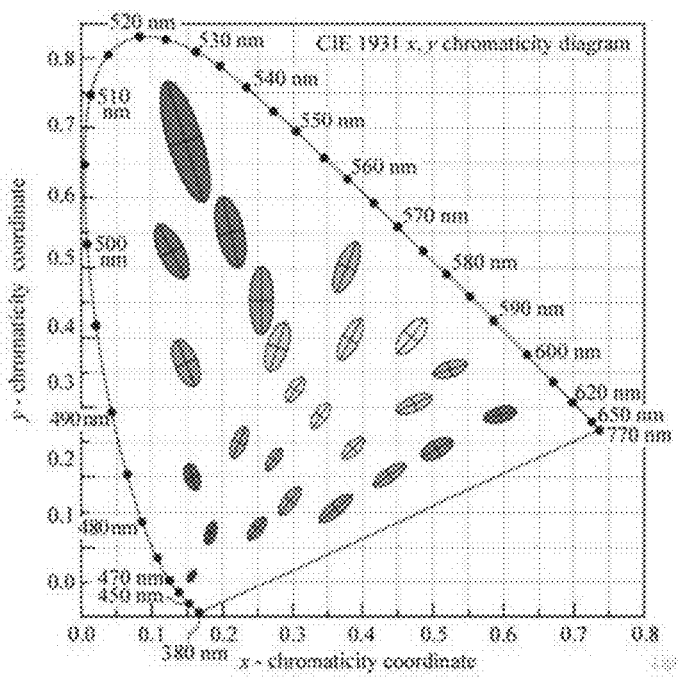
FIG. 12A is a color space chart of a CIE 1976 chromaticity diagram with overlaid MacAdam's ellipses demonstrating just noticeable color differences as per perceived by human visual system.
Figure 12B:
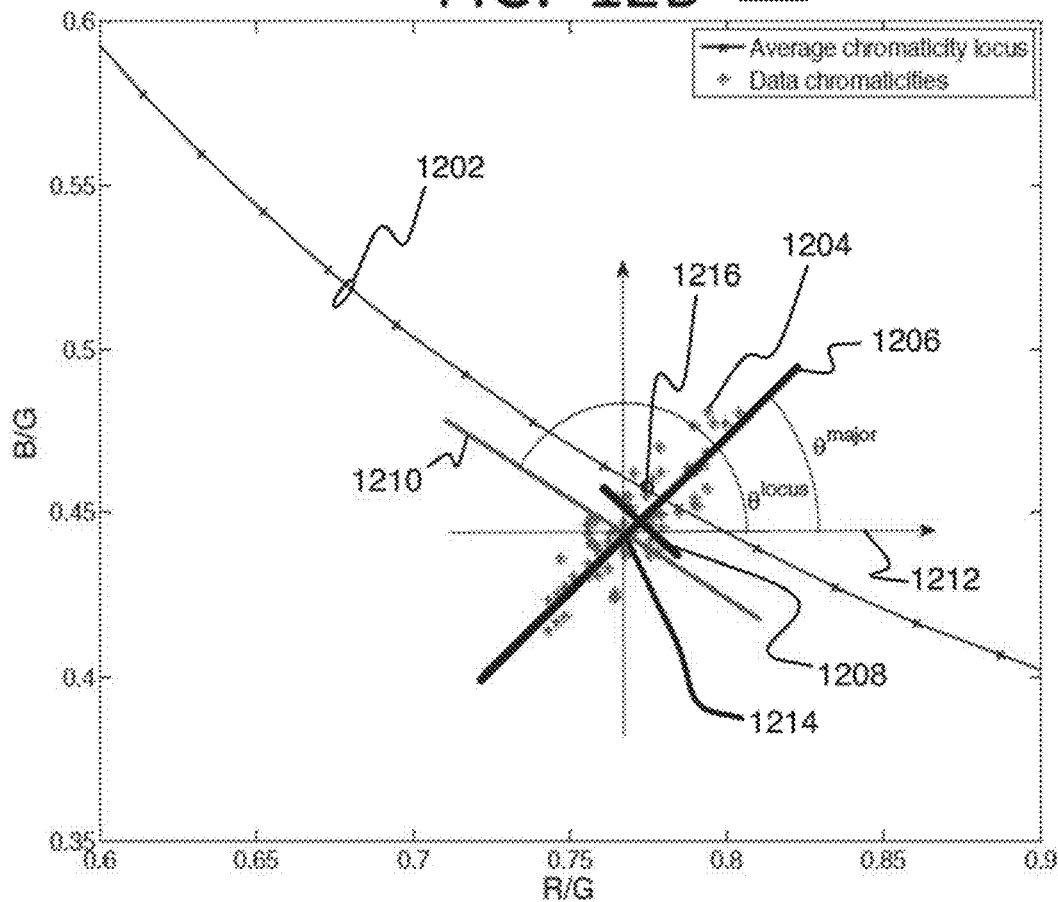
FIG. 12B is a graph of data distribution in chromaticity R/G, B/G space from an example image and showing principal axes of data variability along which the compactness can be measured according to at least one of the implementations herein.

Referring to FIG. 12B, process 1100 may include "map data distributions on the chromaticity space for individual illuminants" 1116. Initially, the mapping operation may include "convert image data to chromaticity space units" 1118, and as mentioned, if the data distribution is not already converted to the units of the chromaticity space. By the current example, the system may convert the lens shading corrected RGB grid (or modified image data) into the chromaticity grid (R/B, B/G) as shown on chromaticity graph 1201.

The mapping operation 1116 also may include "divide image data into blocks" 1120. This may include subdividing the image into overlapping rectangular blocks by one example. The results of the division form a separate data distribution for each or individual blocks so that an individual block has its own data distribution for each LSC table and corresponding illuminant being analyzed. By one form, 6×4 for 24 blocks are used and are overlapped to avoid omission of areas on the image.

Whether for an entire image or individual blocks of the image, each data distribution is then mapped to a chromaticity space. A chromaticity space graph 1201 shows a Planckian average chromaticity locus 1202 and a data distribution 1204 mapped on the graph 1201. As can be seen, the data distribution 1204 generally extends, or is elongated in, a diagonal direction up to the right and along a principal axis 1206. A second largest axis 1208 of the data distribution is orthogonal to the principal axis 1206. A locus tangent line 1210 that is a tangent line of the locus 1201 was moved to a mean 1214 of the data distribution and is used to determine compactness score adjustments as explained below.

Then, process 1100 may include "measure the color variation of the data distribution" 1122. As mentioned, this may involve a principal component analysis (PCA) decomposition that is applied to the chromaticity data of each block and that includes applying a linear transformation:

$$y = Vx \qquad (1)$$

where x is the vector of original data chromaticities within a block, V is the matrix of eigenvectors or principal components corresponding to largest eigenvalues of x, and y is the data representation by principal components. Eigenvectors in V define the two principal axes of a data ellipsoid, and retain most of the information about the color variations within the block. Thus, the principal components of a data distribution here is a principal (or major axis) (1206 on FIG. 12B) and a minor (or secondary) axis (1208 on FIG. 12B) of the data distribution projected onto those axes. The eigenvalues then are the magnitudes of those axes 1206 and 1208, and the eigenvectors are the directions of the axes.

To compute the magnitudes of the principal components, process 1100 first may include "determine a covariance matrix for the data distribution" 1124. PCA starts from computing a 2×2 data covariance matrix of data x in equation (1) and of the covariance matrix.

Process 1100 may include "determine the magnitudes of a principal and secondary axes of the data distribution" 1126. This may include determining eigenvalues and eigenvectors of the 2×2 covariance matrix. Particularly, once the covariance matrix is determined, the eigenvalues and eigenvectors can be computed by using standard linear algebra decomposition as one example. As mentioned above, the eigenvalues define the magnitude of data variance along the corresponding principal directions. The eigenvectors indicate the orientation of principal directions of data chromaticity distribution.

Once the eigenvalues and eigenvectors are computed for a data distribution, process 1100 may include "determine an initial compactness score of the data distributions" 1128. Naturally, the unknown light source can be selected among the precomputed candidate correction grids as the one which minimizes the compactness of the data distribution in a chromaticity space. Measuring the data compactness may be determined by computing the total variation along the principal directions of chromaticity distribution. In one implementation, data compactness can be calculated as L2-norm of the vector of eigenvalues calculated as $$l = \sqrt{d_{11}^2 + d_{22}^2} \qquad (2)$$

where $d_{11}$ and $d_{22}$ are the eigenvalues of the 2×2 data covariance matrix. By a different approach, the data compactness can be calculated as an L1-norm of the vector of eigenvectors instead. Other ways of approximating the total variation of the data distribution using a vector of eigenvalues could be used as well, including other p-norms.

Referring to FIG. 12A, process 1100 may include "adjust the initial compactness score depending on parameters factoring the human visual system" 1130. The light source estimation method exploits the properties of human visual system for better discrimination between similarly shaped chromaticity distributions.

More specifically, and previously, it has been found that color variations do not scale linearly in chromaticity space. Instead, the perceptibly different colors appear in ellipsoidal shapes as was shown on MacAdam's graph 1200. These are known as MacAdam's ellipses. See, D. L. MacAdam, "Visual sensitivities to color differences in daylight", Journal of the Optical Society of America, 32(5):247-274, 1942. Following MacAdam's findings, the properties of the human visual system may be incorporated into the estimation task by adding information about position and orientation of the data distribution in chromaticity space. In other words, the initial compactness value l can be adjusted to favor those distributions with maximum deviation along the directions of maximum variability of MacAdam ellipses. It has been found here that the principal (major) axis of those ellipses closely follows the direction tangential to the Planckian average chromaticity locus, and orthogonal to the isotemperature line, i.e., the line of the same correlated color temperature (CCT). From the theory of color perception, this can be demonstrated by the fact that blue and yellow that are tangential to the locus are memory colors, while purple/magenta and green are not memory colors. So blue and yellow casts in the image can generally be tolerated to a much higher degree of acceptance by human eye than purple or green cast, e.g., slightly yellowish snow in the image is generally accepted by the regular observer while purplish snow can rarely be accepted.

Thus, the initial compactness score l can be adjusted by the following equation to reflect the human visual system. The penalization of the data orientation and location may be incorporated into the compactness determination by modifying compactness score l from equation (2) with equation (3) as follows:

$$\hat{l} = \left(1 + \frac{|\tan^{-1}(\sin(\theta^{locus} - \theta^{major}))|}{k}\right) * l * k, \qquad (3)$$

where $\hat{l}$ is the modified compactness of the dataset that takes into account perceptually non-uniform color tolerances of the human visual system, $\theta^{locus}$ is the angle of a tangent line 1210 that passes through a point 1216 on the Planckian average chromaticity locus (or just locus) 1202 closest to the mean 1214 of the input data x (here the tangent 1210 was shifted off of the point 1216 of locus 1202 and was placed at the mean 1214 instead to better show the locus angle $\theta^{locus}$, an angle $\theta^{major}$ is the angle corresponding to the direction of the principal axis 1206 of the distribution (or cloud) of chromaticities in vector x, where both angles are relative to a horizontal axis 1212, and k is the uncertainty scaling factor proportional to the distance between the locus 1202 and mean 1214 of data chromaticities within the block of data being analyzed. The distance may be measured between the mean 1214 and tangent line passing through a point on the locus that is closest to mean 1214. Equation (3) shows that no additional penalty will be given when maximum variability of the dataset coincides with a tangential to the locus curve (i.e., $\theta^{locus}$ equals to $\theta^{major}$), while maximum penalty is given when $\theta^{locus}$ differs from $\theta^{major}$ by $\pi/2$. Term k in equation (3) reflects the uncertainty in color error estimation for highly chromatic objects, and restricts the estimation problem to those blocks that are close enough to the locus. This, again, can be easily justified by MacAdam's studies. As observed from FIG. 12A The light source estimation method exploits the properties of human visual system for better discrimination between similarly shaped chromaticity distributions.

More specifically, and previously, it has been found that color variations do not scale linearly in chromaticity space. Instead, the perceptibly different colors appear in ellipsoidal shapes as was shown on MacAdam's graph 1200. These are known as MacAdam's ellipses. See, quantifying the color error becomes more ambiguous and difficult as the size of ellipsoids denoting just noticeable color difference increases (which is the case for objects that are far from the Planckian average chromaticity locus).

With equation (3) established, process 1100 may include "apply an uncertainty scaling factor to the initial compactness score that indicates a position of the data distribution relative to positions of the ellipses of the human visual system" 1132. This operation may include "apply an uncertainty value that depends on the distance between the mean of the data distribution and the Planckian average chromaticity locus" 1134, and as described above to use the distance from the mean 1214 of the data distribution to the closest point on the locus 1302. The effect is to weight the total compactness by the distance of the data distribution from the average chromaticity locus. The greater the distance, the larger is the uncertainty in color error estimation. As justified by MacAdam's studies, the quantification of color differences for highly chromatic objects is much more ambiguous than the quantification of color differences for achromatic objects (which are data distributions closer to the locus).

Also, process 1100 then may include "adjust the initial compactness score depending on a general direction of the data distribution relative to the major axis of the ellipses of the human visual system" 1136. This may include "adjust the initial compactness score depending on an angle of the principal axis of the data distribution relative to an angle of the Planckian average chromaticity locus" 1138, and as described above using the angle between the principal axis of the data distribution and the angle of the tangent of the locus. This has the effect of weighting the total compactness score by the orientation of the data principal direction as shown in equation (3). Distributions along the directions tangential to the average chromaticity locus are more likely to belong to the true illuminant, while distributions orthogonal to the average chromaticity locus are less likely to belong to the true illuminant.

Process 1100 may include "use the final compactness scores to provide each illuminant with a likelihood of being the true illuminant" 1140. The values are computed so that the system will "select the highest likelihood as the illuminant with the smallest chromaticity variation" 1142, and the process 1100 may include "determine a likelihood for each block of an image" 1144. Thus, the operations 1116 to 1140 are repeated for each candidate LSC table, and for each block, so that each block has a set of likelihoods where the highest likelihood of the block indicates the smallest chromaticity variation and in turn the most likely illuminant and a corresponding candidate LSC table. Some blocks may indicate the same most likely illuminant and other blocks may indicate different illuminants.

Thereafter, the process 1100 may include "fuse the likelihoods from all blocks of a single image with likelihoods per each illuminant so that the likelihoods add up to 1" 1146. Thus, by one approach, a subset of blocks with smallest compactness score $\hat{l}$ is selected. Alternatively, this can be viewed as selecting the blocks representing homogenous regions in a scene. The likelihoods from those blocks are further summed up and normalized in such a way that they add up to 1. These likelihoods can then be provided to other 3A applications.

Process 1100 may include "provide the likelihoods to correct color on an image" 1148. By one form, the likelihoods are separately provided to a LSC unit, an AWB unit, and a CCM unit. By another form, the likelihoods are only provided to the LSC unit, and the AWB unit and the CCM unit receive the CCT of the most likely illuminant of the image. Otherwise, the AWB and CCM indirectly benefit from the more accurate final lens shading correction tables that are generated. These and other options are explained below.

Figure 13A:
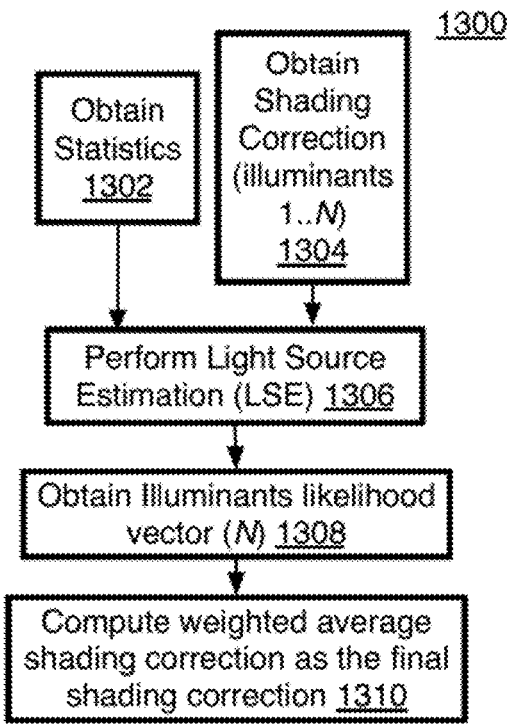
FIG. 13A is a flow chart of a method of lens shading correction using the light source estimation according to at least one of the implementations herein.

Referring to FIG. 13A, a method 1300 of lens shading correction is described and corresponds to the process 1100 operation to "determine a final composite LSC table based at least in part by using the likelihoods as weights" 1150, and as mentioned above. Process 1300 may include "obtain statistics" 1302, "obtain shading correction (illuminants 1 . . . N) 1304, and "perform light source estimation (LSE) 1306 all as described above. Process 1300 then may include "obtain illuminants likelihood vector (N)" 1308, which includes obtaining the LSC tables corresponding to the likelihoods of each illuminant present and may be considered a vector, and to be applied to the non-LSC corrected image data to generate revised LSC grids. Thus, process 1300 then may include "compute weighted average shading correction" 1310 and by using the likelihoods to generate an average weighted LSC table from the LSC grids generated in operation 1308, or in other words, a final composite LSC table to be provided for correcting the color of an image.

By the option of device 1000, the LSC unit operates as described above where the likelihoods are used merely as preliminary or refinement likelihoods and the final fused composite LSC table is still based on AWB-corrected HSV-space errors. Thus, the likelihoods here may be used instead of the $P_{CCT}$ probabilities from the CCT estimation unit. Second, the likelihoods may be used to revise the $P_{CCT}$ by combining them for example or averaging the probabilities. These first two options may always occur or may occur when some criteria are determined, such as using the LSE unit probabilities only when there is a complex image determination for example, or higher quality is needed. Many other criteria could be used as well.

By a third option, the LSE unit probabilities are provided to select the LSC tables which are then provided for the GW-AWB corrections. Thereafter, however, the conversion to HSV space and confidence and error computations are omitted, and the LSC tables are provided directly for fusion to a single final corrected LSC table as per usual fusion operation. This assumes the LSE unit probabilities are highly accurate. By a fourth option, the GW-AWB adjustments are omitted as well, and the selected LSC tables from the LSE unit probabilities (or compactness values) are provided directly to the fusion unit.

Figure 13B:
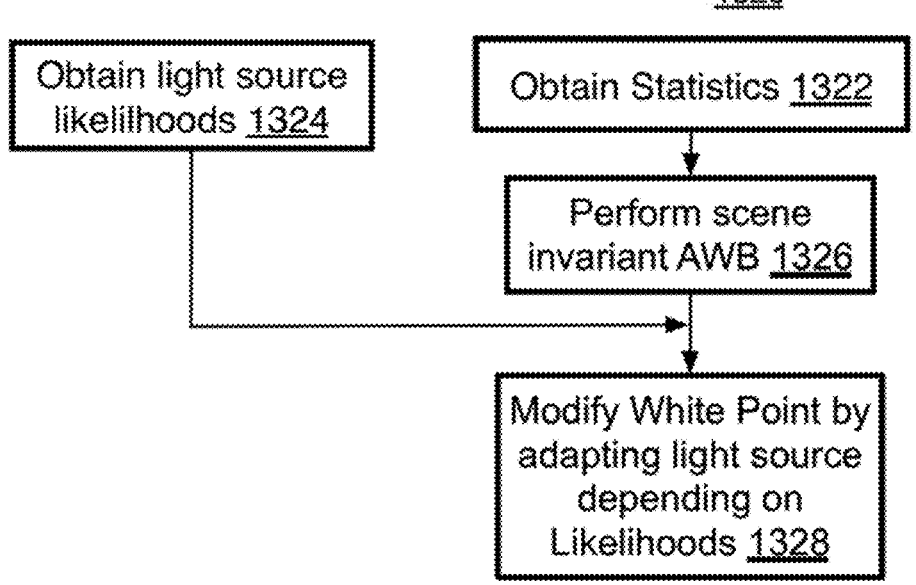
FIG. 13B is a flow chart of a method of automatic white balance using the results from the light source estimation method according to at least one of the implementations herein.

Referring to FIG. 13B, and separately from the LSC operations by one approach, process 1100 may include "perform AWB by using the likelihoods to modify the white point" 1152. By this form, a process 1320 uses the likelihoods from the present light source estimation in a scene invariant (or temporal prior) white point estimation procedure by the AWB unit. Specifically, it has been found that illumination chromaticity estimation for a consecutive sequence of frames, such as a stream of video frames, in the presence of arbitrary scene and illumination condition changes may be used to improve computational color constancy, and in turn, provide more accurate, good quality images. In one approach, the AWB uses a temporal AWB technique that uses a scene illumination prior to serve as a temporally invariant representation for the current scene illuminant, and further incorporates that information into the white point estimation process. This approach helps to stabilize and improve the performance of AWB for difficult dynamic scenes. See, for example, U.S. patent application Ser. No. 15/857,455, cited above. However, if the temporal sequence involves scene illuminant change, the temporal stabilization proposed in this technique may not properly reset the current scene white point and adapt to the new illuminant since the AWB algorithm is not typically aware of the underlying light source. However, the integration of the present light source estimation process into the automatic white balancing as described above assists with handling the change in illumination conditions, thereby reducing color reproduction errors.

Thus, by one form, process 1320 may include "obtain light source likelihoods" 1324 using the procedure described above, "obtain statistics" 1322 also described above, and "preform scene invariant AWB" 1324 such as that described in U.S. patent application Ser. No. 15/857,455, cited above.

Thereafter, the process 1320 may include "modify white point by adapting light source depending on likelihoods" 1328. When the likelihoods are provided to the AWB adaptation unit 1328, the AWB unit computes the CCT and reference chromaticity of the illuminant.

The likelihoods, and determination of the CCT corresponding to the current illuminant, may simplify the AWB process by reducing the search range for the correct white point. Since the estimation computed light source CCT based on the likelihoods from the LSE unit should be accurate, the AWB white point search for the white point CCT can eliminate those CCTs that are considered too distant from the CCT determined to be the most likely illuminant. The threshold for such distances may be determined by heuristics Also, as mentioned, the AWB will receive LSC corrected image data to perform the AWB operations. Since this image data was corrected by using the LSE unit, the AWB white point determination at least should be more accurate, providing better quality images.

Figure 13C:
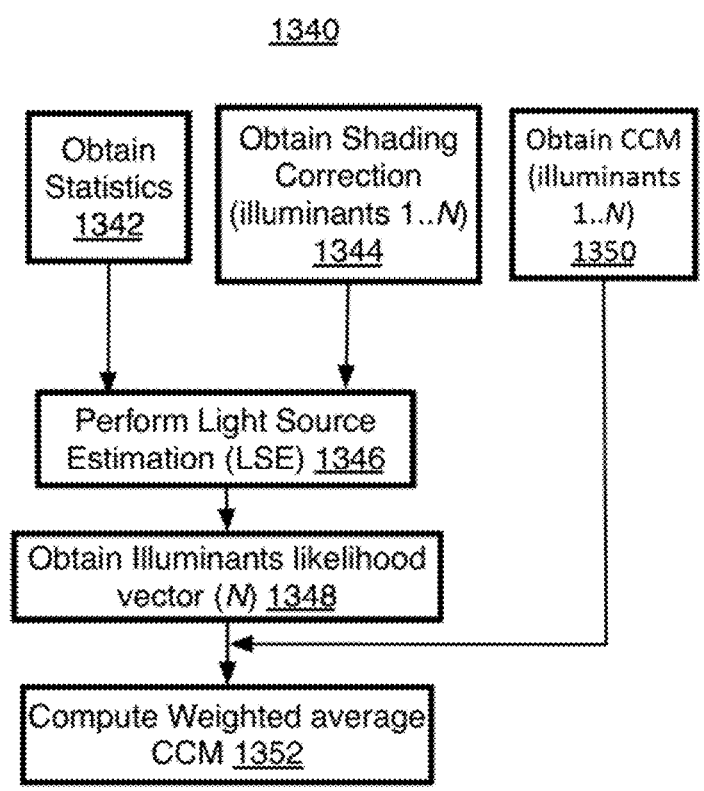
FIG. 13C is a flow chart of a method of color conversion using the results from the light source estimation method according to at least one of the implementations herein.

Referring to FIG. 13C, process 1100 may include "determine a color conversion matrix by using the likelihoods" 1154. This may include process 1340 for determining a color conversion matrix, and may include "obtain statistics" 1342, obtain shading correction (illuminants 1 . . . N)" 1344, and perform light source estimation (LSE)" 1346, all described above. Process 1340 also may include "obtain illuminant likelihood vector (N)" 1348, and as mentioned above, refers to obtaining the resulting likelihoods for each present illuminant and form the LSE unit. Here, the process 1340 also may "obtain CCM (illuminants 1 . . . N)" 1350, which refers to obtaining predetermined CCMs for each illuminant that is represented by the likelihoods.

Generally, color correction matrix transforms the camera output from sensor specific color space to target color space, which in most cases is standard (sRGB) color space to obtain consistent and sensor independent outputs results. Accurate color conversion matrices (CCMs) are usually optimally predetermined for different light sources, and are further dynamically selected in the imaging device based on the current output from AWB algorithm. Since AWB outputs the white point and CCT representing the chromaticity of illumination, but not the illuminant itself, the choice of final CCM may often be inaccurate and error prone due to the fact that different light sources with completely different spectral response characteristics and different CCMs may have a similar chromaticity of the white point.

To avoid this disadvantage then, the process 1340 may include "compute weighted average CCM" 1352. This may include performing a weighted average computation across all CCMs with a represented illuminant. Thus, the resulting CCM is calculated as a weighted average of color correction matrices pre-calculated for known light sources. Since the CCM unit can obtain the illuminant likelihoods from the LSE unit, these also decouple the CCM unit from the AWB unit, so that errors by the AWB do not necessarily transfer to the CCM unit.

Otherwise, when only the LSC unit receives the likelihoods, and the CCM still is improved and more accurate since the obtained CCT is more likely to be an accurate indication of the true illuminant. The CCT for CCM may be obtained from the AWB unit, but the CCM could obtain the CCT directly from the light source estimation unit since the CCT should be sufficiently accurate.

Referring to FIGS. 14A-14H, experimental results are provided that relate to database verification of the color shading correction. Specifically, the present light source estimation method has been tested and verified on a database consisting of 267 test images taken under four different illuminants, namely incandescent light source A, two fluorescent light sources: F11 and F12, and daylight D55 illuminant. Separation between these illuminants is difficult for color shading since shading profiles of these light sources are very different, and the use of the wrong light source, and in turn wrong lens shading correction table, may result in noticeable degradation in image quality. An estimation error for the two tested approaches per each light source is provided in graphs 1400 to 1414 numbered evenly. Error (on the vertical axis of the graphs) was normalized to the range between 0 and 1, where 0 error was attained when a final weight was entirely assigned to the true light source, and error 1 is set when the weight was entirely assigned to the incorrect light source. The horizontal axis of the graphs are image numbers for a sequence of images tested. Results show substantial improvement in light source separation with the present LSE method, where separation improvement is especially impressive for fluorescent F11 and F12 light sources.

The light source estimation results for the database with 267 test images includes the following. The upper row graphs (1400 to 1406) show light source estimation with a conventional algorithm in HSV space. The bottom row graphs (1408 TO 1414) show light source estimation with the present LSE method using PCA:

Graph 1400: 'F12' light source. Cumulative error: 13,422
Graph 1402: 'F11' light source. Cumulative error: 9,984
Graph 1404: 'A' light source. Cumulative error: 3,023
Graph 1406: 'D' light source. Cumulative error: 12,707
Graph 1408: 'F12' light source. Cumulative error: 2,125
Graph 1410: 'F11' light source. Cumulative error: 1,027
Graph 1412: 'A' light source. Cumulative error: 1,145
Graph 1414: 'D' light source. Cumulative error: 1,977

It should be noted that the present LSE method achieved 6 to 10 times improvement in accuracy of light source separation with 30 to 40% lower computational costs (as indicated by).

Significant increase in robustness of estimation makes re-use of estimation results possible in a variety of color correction processes whether for 3A processes or other image correction processes.

Table 1 Computational complexity estimation for simulation executed for database with 267 images for 10 iterations and four illuminants.

TABLE 1

|  | Conventional | Disclosed | Decrease in amt. of Computations % |
|---|---|---|---|
| Number of instructions | 1530443235 | 969665791 | −36% |
| Clock cycles | 925304607 | 514415735 | −44% |

Figure 15:
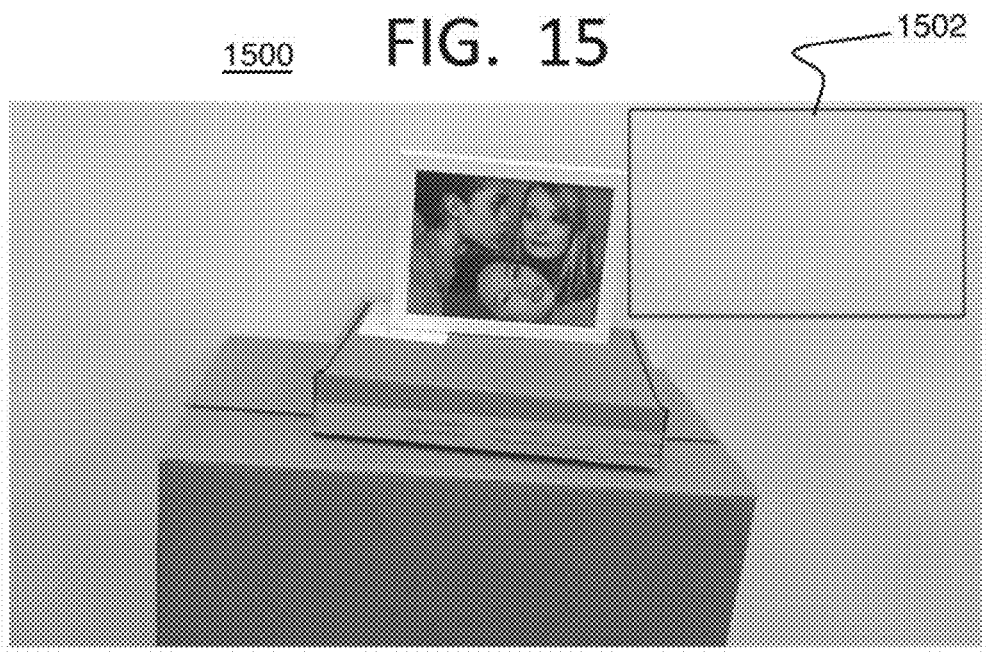
FIG. 15 is a test image showing a region of interest that was used for testing the method used herein when the actual light source is not represented by available lens shading correction grids.

Referring to FIG. 15, an example scene in an image 1500 is illuminated by fluorescent U30 light and has a region of interest (ROI) 1502 of a uniform grey color that was used for a test and analysis. The experiment here tests the estimation of light sources whose correction grids do not accurately match the predefined correction grids created during the tuning (or characterization) phase. So in this case, there are no LSC tables (or grids) for a fluorescent U30 light in the set of pre-characterized light sources.

Figure 16A:
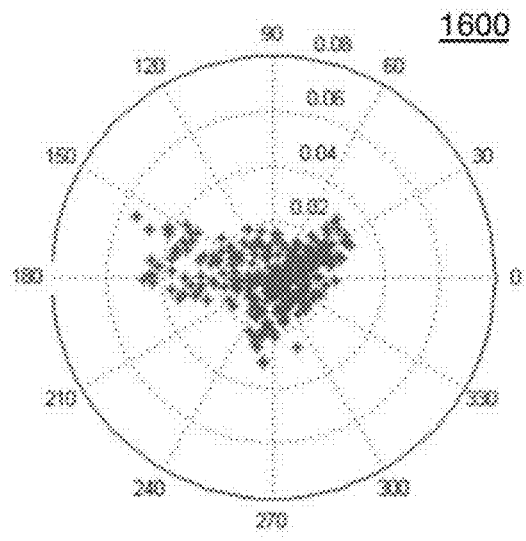
FIG. 16A is a polar chart showing a color data distribution in HSV space for a standard incandescent A light source.
Figure 16B:
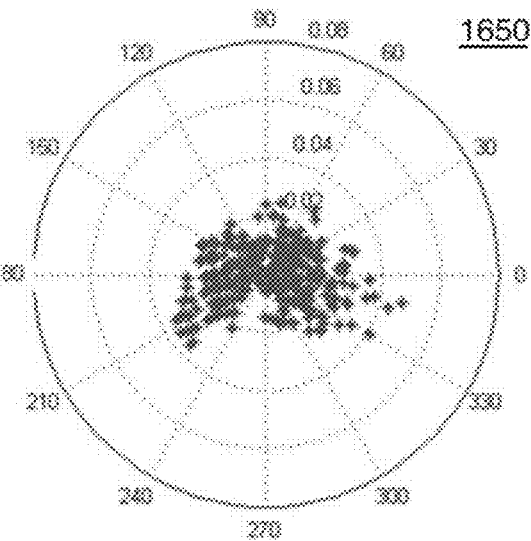
FIG. 16B is a polar chart showing a color data distribution in HSV space for a standard fluorescent F12 light source.

Referring to FIGS. 16A-16B, color variations in an HSV space are depicted on polar graphs 1600, which show the color variation for an incandescent light source A, and polar graph 1650 that shows the color variation for a fluorescent light source F12. The graphs 1600 and 1650 show very minor differences between A and F12 candidate light sources that have been pre-characterized for that camera module, thus making it very difficult for the conventional light source estimation to choose the dominant light source. In a real device, this situation further deteriorates due to temporal color instabilities between adjacent frames when two light sources are interchangeably selected by a light source estimation algorithm.

Figure 17:
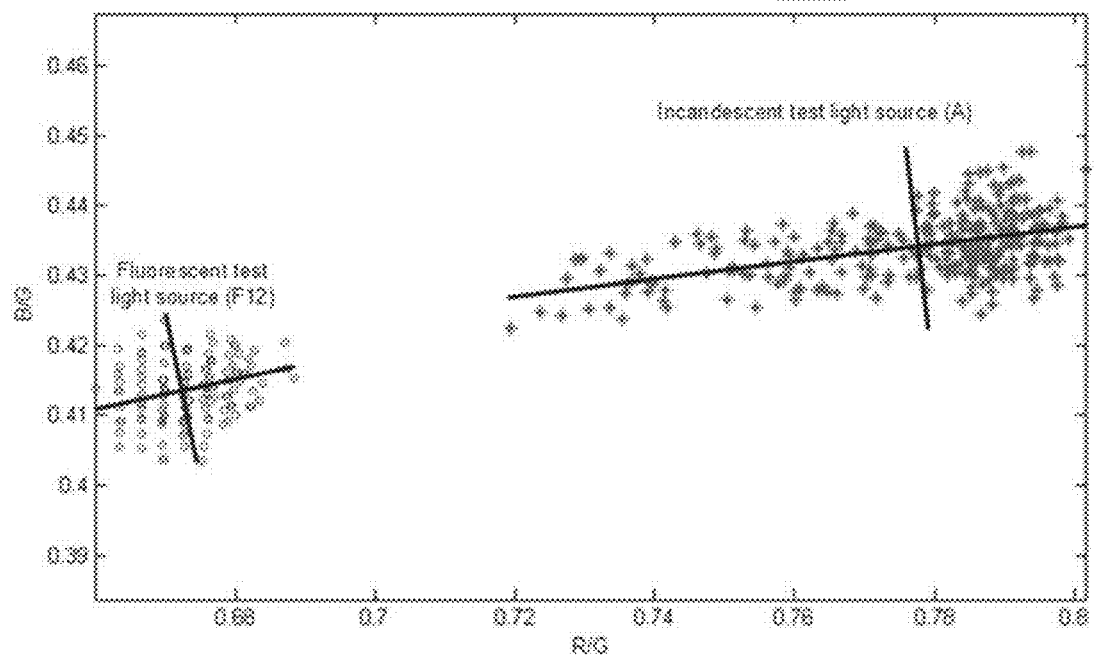
FIG. 17 is a graph showing the color ratio distributions for two different light sources and according to the test performed.

Referring to FIG. 17, the results obtained by using the light source estimation method herein are shown on a chromaticity space graph. Data from the image 1500 and corrected by an F12 light source is much more compact than the data corrected with an A light source. Principal axes for the data shown with dark lines were scaled up for illustration purposes. Eigenvalues for incandescent the A light source are the following:

$$d_{11}^{A}=32.9\times10^{-5},\ d_{22}^{A}=1.54\times10^{-5},$$

while for fluorescent the F12 light source principal component analysis (PCA) decomposition gives the following eigenvalues:

$$d_{11}^{F12}=2.85\times10^{-5},\ d_{22}^{F12}=1.45\times10^{-5}$$

This results in over 10 times difference in data compactness for the two light sources, as measured by equation (3) above, clearly showing that one is not a good substitute for the other.

Figure 18:
FIG. 18 is an example image of an outdoor scene under correlated color temperature (CCT) 6000K.

Referring to FIG. 18, a test was performed to determine how the present light source estimation process could improve the results of AWB when the illumination condition changes, and the temporal prior method is used, such as from an outdoor scene to an indoor scene. An example video sequence has a frame 1800 from an outdoor scene and that has a CCT of 6000K that was used for the experiment.

Specifically, the present LSE method was tested with a typical test sequence a user may capture with an imaging device. As shown in FIGS. 18-20, a test scenario simulates camera movement from outdoor conditions at CCT around 6000K at image 1800 to an indoor fluorescent office scene at CCT around 3600K at image 1900 or 2000. The indoor scene is ambiguous for color constancy as it primarily has a unicolored white wall. With such a scene, the mentioned temporal AWB technique (scene invariant AWB method) may undesirably treat the white as a light brown object under the outdoor daylight illuminant when it does not correctly reset to an indoor illuminant. This may result in strong yellowish cast of the scene in image 1900, and this may occur when the correct light source is not available. Incorporation of the illuminant information into the present light source estimation process helps to detect the illumination change from a D65 illuminant outdoor correction grid to an F11 illuminant correction grid, thus properly resetting the outdoor scene after the light source change, and this is shown in image 2000.

In addition, any one or more of the operations of FIGS. 8 and 11A-11C may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 21:
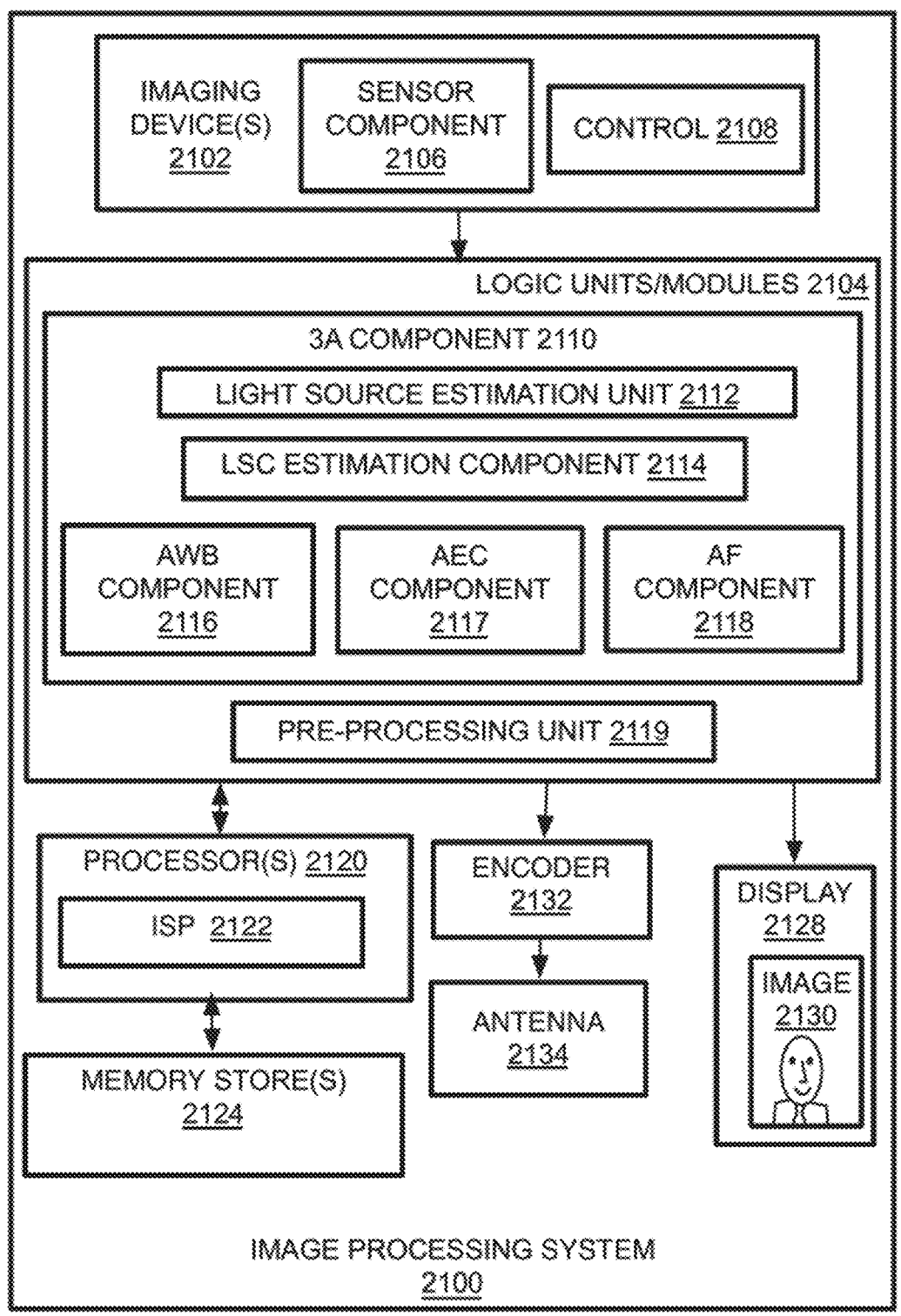
FIG. 21 is an illustrative diagram of an example system.

Referring to FIG. 21, an example image processing system 2100 is arranged in accordance with at least some implementations of the present disclosure. In various implementations, the example image processing system 2100 may have an imaging device 2102 to form or receive captured image data. This can be implemented in various ways. Thus, in one form, the image processing system 2100 may be a digital camera or other image capture device, and imaging device 2102, in this case, may be the camera hardware and camera sensor software, module, or component. In other examples, imaging processing system 2100 may have an imaging device 2102 that includes or may be a camera, and logic modules 2104 may communicate remotely with, or otherwise may be communicatively coupled to, the imaging device 2102 for further processing of the image data.

In either case, such technology may include a camera such as a digital camera system, a dedicated camera device, or an imaging phone, whether a still picture or video camera or some combination of both. Thus, in one form, imaging device 2102 may include camera hardware and optics including one or more sensors as well as auto-focus, zoom, aperture, ND-filter, auto-exposure, flash, and actuator controls. These controls may be part of a sensor module or component 2106 for operating the sensor. The sensor component 2106 may be part of the imaging device 2102, or may be part of the logical modules 2104 or both. Such sensor component can be used to generate images for a viewfinder and take still pictures or video. The imaging device 2102 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 2102 may be provided with an eye tracking camera. The imaging device 2102 also may have a lens actuator or control 2108 that has a lens and a lens driver or driver logic that receives commands to move the lens and applies an electrical current to move the lens.

In the illustrated example, the logic modules 2104 may include the 3A component that, in turn, may include an AF component 2118, an automatic white balance (AWB) component 2116, and an automatic exposure control (AEC) component 2117. The 3A component unit 2110 also may have a lens shading correction (LSC) table estimation component 2114 and a light source estimation unit 2112 that performs many of the operations described herein. A pre-processing unit 2119 also is provided. The tasks performed by these units are described above with where the description of the task corresponds to the name of the unit. The 3A component unit 2110 may be operated by, or even entirely or partially located at, processor(s) 2120, and which may include an ISP 2122 to perform the operations. The logic modules may be communicatively coupled to the components of the imaging device 2102 in order to receive raw image data. In these cases, it is assumed the logic modules 2104 are considered to be separate from the imaging device. This need not be so, and the logic modules very well may be considered to be part of the imaging device as well.

The image processing system 2100 may have one or more processors 2120 which may include a dedicated image signal processor (ISP) 2122 such as the Intel Atom, memory stores 2124 which may or may not hold the LSC tables and other light source estimation and 3A correction data, one or more displays 2128 to provide images 2130, encoder 2132, and antenna 2134. In one example implementation, the image processing system 2100 may have the display 2128, at least one processor 2120 communicatively coupled to the display, at least one memory 2124 communicatively coupled to the processor to perform the operations described herein as explained above. The encoder 2132 and antenna 2134 may be provided to compress the modified image date for transmission to other devices that may display or store the image as well as provide the motion data for block matching. It will be understood that the image processing system 2100 may also include a decoder (or encoder 2132 may include a decoder) to receive and decode image data for processing by the system 2100. Otherwise, the processed image 2130 may be displayed on display 2128 or stored in memory 2124. As illustrated, any of these components may be capable of communication with one another and/or communication with portions of logic modules 2104 and/or imaging device 2102. Thus, processors 2120 may be communicatively coupled to both the image device 2102 and the logic modules 2104 for operating those components. By one approach, although image processing system 2100, as shown in FIG. 21, may include one particular set of blocks or actions associated with particular components or modules, these blocks or actions may be associated with different components or modules than the particular component or module illustrated here.

Figure 22:
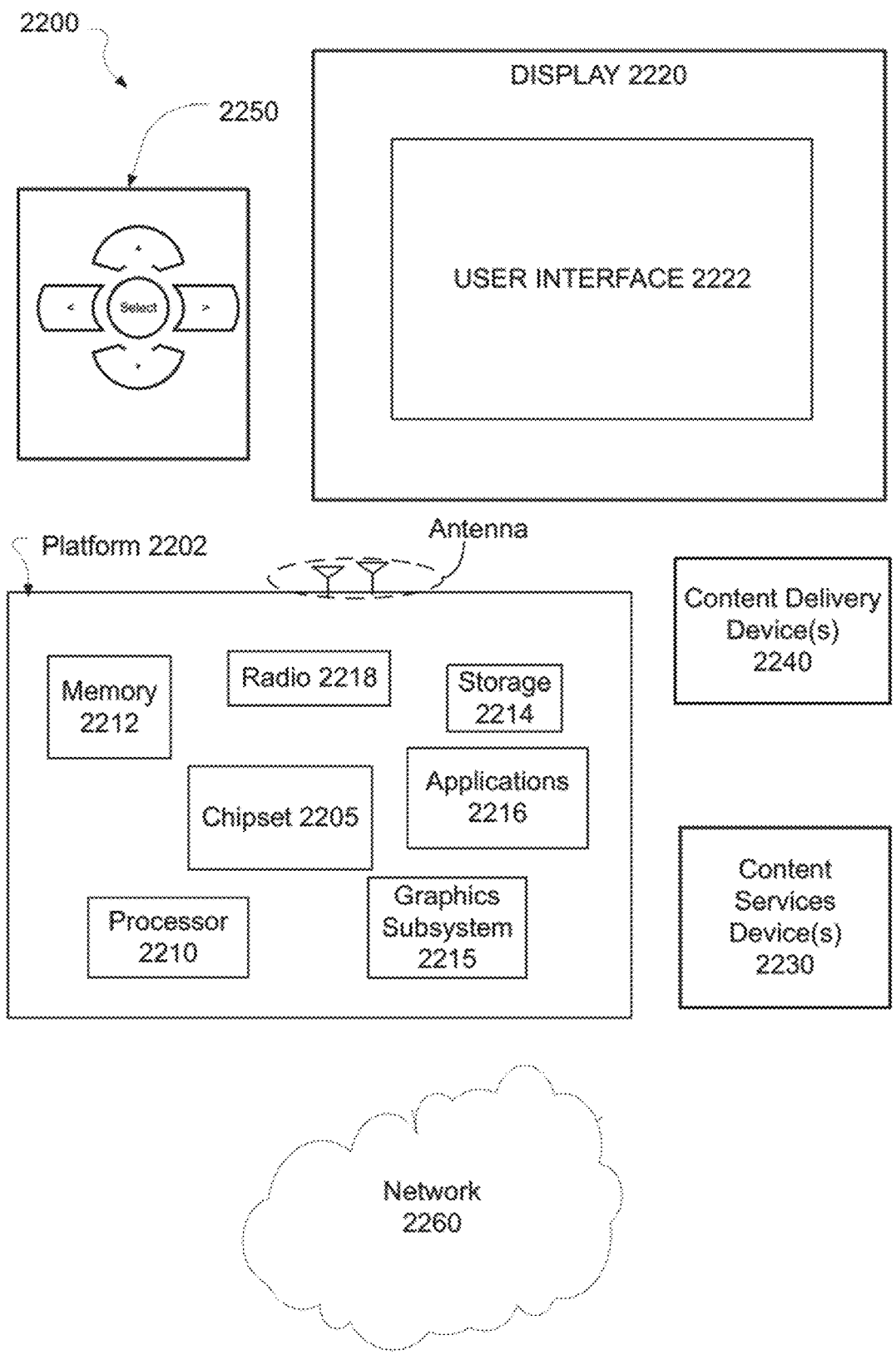
FIG. 22 is an illustrative diagram of another example system.

Referring to FIG. 22, an example system 2200 in accordance with the present disclosure operates one or more aspects of the image processing system described herein. It will be understood from the nature of the system components described below that such components may be associated with, or used to operate, certain part or parts of the image processing system described above. In various implementations, system 2200 may be a media system although system 2200 is not limited to this context. For example, system 2200 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 2200 includes a platform 2202 coupled to a display 2220. Platform 2202 may receive content from a content device such as content services device(s) 2230 or content delivery device(s) 2240 or other similar content sources. A navigation controller 2250 including one or more navigation features may be used to interact with, for example, platform 2202 and/or display 2220. Each of these components is described in greater detail below.

In various implementations, platform 2202 may include any combination of a chipset 2205, processor 2210, memory 2212, storage 2214, graphics subsystem 2215, applications 2216 and/or radio 2218. Chipset 2205 may provide intercommunication among processor 2210, memory 2212, storage 2214, graphics subsystem 2215, applications 2216 and/or radio 2218. For example, chipset 2205 may include a storage adapter (not depicted) capable of providing intercommunication with storage 2214.

Processor 2210 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 2210 may be dual-core processor(s), dual-core mobile processor(s), and so forth.

Memory 2212 may be implemented as a volatile memory device such as, but not limited to, a Random Access Memory (RAM), Dynamic Random Access Memory (DRAM), or Static RAM (SRAM).

Storage 2214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2214 may include technology to increase the storage performance enhanced protection for valuable digital media when multiple hard drives are included, for example.

Graphics subsystem 2215 may perform processing of images such as still or video for display. Graphics subsystem 2215 may be a graphics processing unit (GPU) or a visual processing unit (VPU), for example. An analog or digital interface may be used to communicatively couple graphics subsystem 2215 and display 2220. For example, the interface may be any of a High-Definition Multimedia Interface, Display Port, wireless HDMI, and/or wireless HD compliant techniques. Graphics subsystem 2215 may be integrated into processor 2210 or chipset 2205. In some implementations, graphics subsystem 2215 may be a stand-alone card communicatively coupled to chipset 2205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 2218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2218 may operate in accordance with one or more applicable standards in any version.

In various implementations, display 2220 may include any television type monitor or display. Display 2220 may include, for example, a computer display screen, touch screen display, video monitor, television-like device, and/or a television. Display 2220 may be digital and/or analog. In various implementations, display 2220 may be a holographic display. Also, display 2220 may be a transparent surface that may receive a visual projection. Such projections may convey various forms of information, images, and/or objects. For example, such projections may be a visual overlay for a mobile augmented reality (MAR) application. Under the control of one or more software applications 2216, platform 2202 may display user interface 2222 on display 2220.

In various implementations, content services device(s) 2230 may be hosted by any national, international and/or independent service and thus accessible to platform 2202 via the Internet, for example. Content services device(s) 2230 may be coupled to platform 2202 and/or to display 2220. Platform 2202 and/or content services device(s) 2230 may be coupled to a network 2260 to communicate (e.g., send and/or receive) media information to and from network 2260. Content delivery device(s) 2240 also may be coupled to platform 2202 and/or to display 2220.

In various implementations, content services device(s) 2230 may include a cable television box, personal computer, network, telephone, Internet enabled devices or appliance capable of delivering digital information and/or content, and any other similar device capable of unidirectionally or bidirectionally communicating content between content providers and platform 2202 and/display 2220, via network 2260 or directly. It will be appreciated that the content may be communicated unidirectionally and/or bidirectionally to and from any one of the components in system 2200 and a content provider via network 2260. Examples of content may include any media information including, for example, video, music, medical and gaming information, and so forth.

Content services device(s) 2230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2202 may receive control signals from navigation controller 2250 having one or more navigation features. The navigation features of controller 2250 may be used to interact with user interface 2222, for example. In implementations, navigation controller 2250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2250 may be replicated on a display (e.g., display 2220) by movements of a pointer, cursor, focus ring, or other visual indicators displayed on the display. For example, under the control of software applications 2216, the navigation features located on navigation controller 2250 may be mapped to virtual navigation features displayed on user interface 2222, for example. In implementations, controller 2250 may not be a separate component but may be integrated into platform 2202 and/or display 2220. The present disclosure, however, is not limited to the elements or in the context shown or described herein.

In various implementations, drivers (not shown) may include technology to enable users to instantly turn on and off platform 2202 like a television with the touch of a button after initial boot-up, when enabled, for example. Program logic may allow platform 2202 to stream content to media adaptors or other content services device(s) 2230 or content delivery device(s) 2240 even when the platform is turned "off." In addition, chipset 2205 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 2200 may be integrated. For example, platform 2202 and content services device(s) 2230 may be integrated, or platform 2202 and content delivery device(s) 2240 may be integrated, or platform 2202, content services device(s) 2230, and content delivery device(s) 2240 may be integrated, for example. In various implementations, platform 2202 and display 2220 may be an integrated unit. Display 2220 and content service device(s) 2230 may be integrated, or display 2220 and content delivery device(s) 2240 may be integrated, for example. These examples are not meant to limit the present disclosure.

In various implementations, system 2200 may be implemented as a wireless system, a wired system, or a combination of both. When implemented as a wireless system, system 2200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 23.

Figure 23:
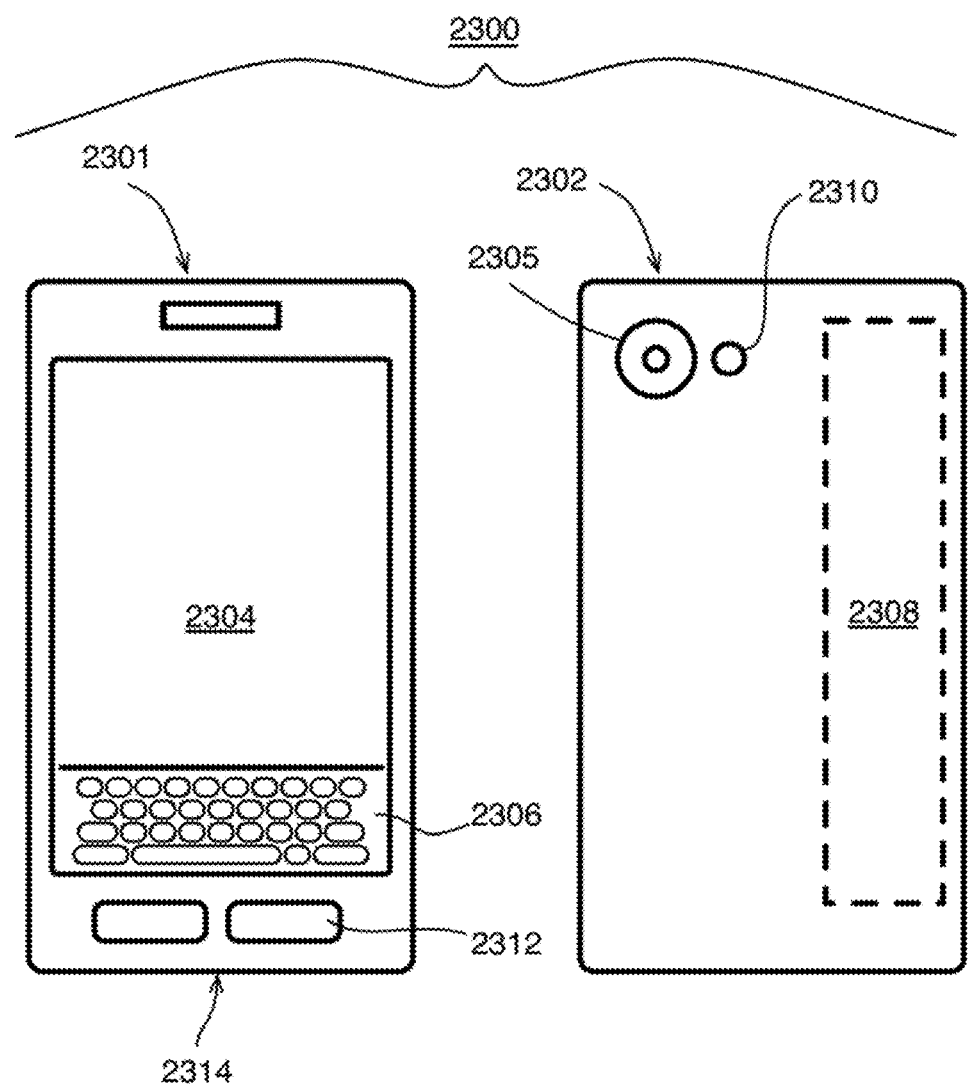
FIG. 23 illustrates another example device, all arranged in accordance with at least some implementations of the present disclosure.

Referring to FIG. 23, a small form factor device 2300 is one example of the varying physical styles or form factors in which systems 2100 or 2200 may be embodied. By this approach, device 2300 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 23, device 2300 may include a housing with a front 2301 and a back 2302. Device 2300 includes a display 2304, an input/output (I/O) device 2306, and an integrated antenna 2308. Device 2300 also may include navigation features 2312. I/O device 2306 may include any suitable I/O device for entering information into a mobile computing device. Examples for I/O device 2306 may include an alphanumeric keyboard, a numeric keypad, a touch pad, input keys, buttons, switches, microphones, speakers, voice recognition device and software, and so forth. Information also may be entered into device 2300 by way of microphone 2314, or may be digitized by a voice recognition device. As shown, device 2300 may include a camera 2305 (e.g., including at least one lens, aperture, and imaging sensor) and an illuminator 2310, such as those described herein, integrated into back 2302 (or elsewhere) of device 2300. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of light source estimation for image processing, comprises obtaining image data of at least one image; forming a plurality of separate data distributions comprising separately applying, to the image data, lens shading correction tables each of a different illuminant of a set of available illuminants; mapping the data distributions in a chromaticity space; measuring the compactness of the individual data distributions on the chromaticity space; generating likelihoods that the individual data distributions are associated with the true illuminant of the image comprising using compactness measurements of the individual data distributions; and using the likelihoods to correct color on at least one image.

By another implementation, the method may comprise wherein the illuminant associated with the smallest data distribution is the most likely illuminant to be the true illuminant, wherein the measuring of compactness comprises determining principal components of the data distribution comprising a principal axis and a minor axis on the chromaticity space, wherein the measuring of compactness comprises determining the magnitude of the axes. The method comprising determining eigenvalues of a covariance matrix of the data distribution and that represent the magnitudes of the principal axes; determining a norm of the eigenvalues to form a single compactness score of the data distribution and that represent the directions of the principal axes; and determining eigenvectors of a covariance matrix of the data distribution and that represent the direction of the principal axes.

The method also comprises wherein measuring the compactness comprises factoring the human visual system (HVS) comprising favoring data distributions that are closer to the position or orientation or both of an ellipse of indistinguishable color of the human visual system (HVS), wherein measuring the compactness comprises favoring data distributions as a principal axis of the data distribution extends in a direction closer to parallel to a tangent of a Planckian average chromaticity locus, wherein measuring the compactness comprises factoring an uncertainty scaling factor that indicates a position of the data distribution relative to a position of at least one ellipse of indistinguishable color of the human visual system, and wherein measuring the compactness comprises factoring an uncertainty scaling factor that is proportional to the distance between a Planckian average chromaticity locus and a point within the data distribution, wherein the uncertainty scaling factor favors data distributions closer to the Planckian average chromaticity locus.

By yet another implementation, a computer-implemented system of light source estimation comprises a display; at least one processor communicatively coupled to the display; at least one memory communicatively coupled to at least one processor and storing image data of at least one image of a video sequence or at least one still photograph forming an image; and at least one light estimation unit communicatively coupled to the processor, and to operate by: obtaining image data of at least one image captured by a camera; forming a plurality of separate data distributions comprising separately applying, to the image data, lens shading correction tables each of a different illuminant of a set of available illuminants; mapping the data distributions in a chromaticity space; measuring the compactness of the individual data distributions on the chromaticity space; generating likelihoods that the individual data distributions are associated with the true illuminant of the image comprising using compactness measurements of the individual data distributions; and providing the likelihoods to correct color on at least one image.

By another example, the system includes wherein the measuring of compactness comprises determining principal components of the data distribution comprising a principal axis and a minor axis orthogonal to the principal axis on the chromaticity space, and determining the magnitude of the axes to be used to determine a compactness of a data distribution, wherein measuring the compactness comprises factoring the human visual system (HVS) comprising favoring data distributions as a position or orientation or both of the data distribution is closer to the position or orientation or both of an ellipse of indistinguishable color of the human visual system (HVS) as represented by a Planckian average chromaticity locus, wherein providing the likelihoods comprises determining a final likelihood of multiple likelihoods each of a block of multiple blocks of the image and indicating the same illuminant, and fusing together the final likelihoods each of a different illuminant, and wherein providing the likelihoods comprises providing a set of likelihoods with one for each illuminant, and separately providing the likelihoods to a lens shading correction unit, an automatic white balance unit, and a color conversion matrix unit to perform color correction on an image.

The system also may comprise a lens shading correction unit being arranged to use the likelihoods to determine a weighted average lens shading correction table to be used to correct colors of an image; an automatic white balance unit being arranged to use the likelihoods to compute a correlated color temperature (CCT) and reference chromaticity of an illuminant; and a color conversion unit being arranged to use the likelihoods to compute a weighted average color conversion matrix to convert colors to a display color space.

By one approach, at least one computer readable medium comprises a plurality of instructions that in response to being executed on a computing device, causes the computing device to operate by: obtaining image data of at least one image; forming a plurality of separate data distributions comprising separately applying, to the image data, lens shading correction tables each of a different illuminant of a set of available illuminants; mapping the data distributions in a chromaticity space; measuring the compactness of the individual data distributions on the chromaticity space; generating likelihoods that the individual data distributions are associated with the true illuminant of the image comprising using compactness measurements of the individual data distributions; and using the likelihoods to correct color on at least one image.

By other approaches, the instructions cause the computing device to include wherein the measuring of compactness comprises determining principal components of the data distribution comprising a principal axes, and determining the magnitude of the axes to be used to determine a compactness of a data distribution, wherein the measuring of compactness comprises determining a norm of eigenvalues of a covariance matrix as the magnitudes of the axes, wherein measuring the compactness comprises factoring the human visual system (HVS) comprising favoring data distributions depending on a position or orientation or both of the data distribution relative to a Planckian average chromaticity locus, and wherein measuring the compactness comprises factoring at least one of: (1) an angle between a principal axis of the data distribution and a tangent of a Planckian average chromaticity locus, and (2) a distance between a point on the data distribution and a point on the Planckian average chromaticity locus.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of light source estimation for image processing, comprising:
   obtaining image data of at least one image;
   forming a plurality of separate data distributions comprising separately applying, to the image data, lens shading correction tables each of a different illuminant of a set of available illuminants;
   mapping the data distributions in a chromaticity space;
   measuring a compactness of individual ones of the data distributions on the chromaticity space;
   generating likelihoods that the individual data distributions are associated with a true illuminant of the image comprising using compactness measurements of the individual data distributions; and
   using the likelihoods to correct color on at least one image.

2. The method of claim 1 wherein the illuminant associated with a smallest data distribution is the most likely illuminant to be the true illuminant.

3. The method of claim 1 wherein the measuring of compactness comprises determining principal components of the data distribution comprising a principal axis and a minor axis on the chromaticity space.

4. The method of claim 3 wherein the measuring of compactness comprises determining a magnitude of the axes.

5. The method of claim 4 comprising determining eigenvalues of a covariance matrix of the data distribution and that represent the magnitudes of the axes.

6. The method of claim 5 comprising determining a norm of the eigenvalues to form a single compactness score of the data distribution.

7. The method of claim 3 comprising determining eigenvectors of a covariance matrix of the data distribution and that represent a direction of the axes.

8. The method of claim 1 wherein measuring the compactness comprises factoring a human visual system (HVS) comprising favoring data distributions that are closer to a position or orientation or both of an ellipse of indistinguishable color of the human visual system (HVS).

9. The method of claim 1 wherein measuring the compactness comprises favoring data distributions as a principal axis of the data distribution extends in a direction closer to parallel to a tangent of a Planckian average chromaticity locus.

10. The method of claim 1 wherein measuring the compactness comprises factoring an uncertainty scaling factor that indicates a position of the data distribution relative to a position of at least one ellipse of indistinguishable color of the human visual system.

11. The method of claim 1 wherein measuring the compactness comprises factoring an uncertainty scaling factor that is proportional to a distance between a Planckian average chromaticity locus and a point associated with the data distribution.

12. The method of claim 11 wherein the uncertainty scaling factor favors data distributions closer to the Planckian average chromaticity locus.

13. A computer-implemented system of light source estimation comprising:
   a display;
   at least one processor communicatively coupled to the display;
   at least one memory communicatively coupled to at least one processor and storing image data of at least one image of a video sequence or at least one still photograph forming an image; and
   at least one light estimation unit communicatively coupled to the processor, and to operate by:
     obtaining image data of at least one image captured by a camera;
     forming a plurality of separate data distributions comprising separately applying, to the image data, lens shading correction tables each of a different illuminant of a set of available illuminants;

mapping the data distributions in a chromaticity space;
measuring a compactness of individual ones of the data distributions on the chromaticity space;
generating likelihoods that the individual data distributions are associated with a true illuminant of the image comprising using compactness measurements of the individual data distributions; and
providing the likelihoods to correct color on at least one image.

14. The system of claim 13 wherein the measuring of compactness comprises determining principal components of the data distribution comprising a principal axis and a minor axis orthogonal to the principal axis on the chromaticity space and determining a magnitude of the axes to be used to determine a compactness of a data distribution.

15. The system of claim 13 wherein measuring the compactness comprises factoring a human visual system (HVS) comprising favoring data distributions as a position or orientation or both data distribution is closer to the position or orientation or both of an ellipse of indistinguishable color of the human visual system (HVS) as represented by a Planckian average chromaticity locus.

16. The system of claim 13 wherein providing the likelihoods comprises determining a final likelihood of multiple likelihoods each of a block of multiple blocks of the image and indicating a same illuminant, and fusing together the final likelihoods each of a different illuminant.

17. The system of claim 13 wherein providing the likelihoods comprises providing a set of likelihoods with one for each illuminant, and separately providing the likelihoods to a lens shading correction unit, an automatic white balance unit, and a color conversion matrix unit to perform color correction on an image.

18. The system of claim 13 comprising a lens shading correction unit being arranged to use the likelihoods to determine a weighted average lens shading correction table to be used to correct colors of an image.

19. The system of claim 13 comprising an automatic white balance unit being arranged to use the likelihoods to compute a correlated color temperature (CCT) and reference chromaticity of an illuminant.

20. The system of claim 13 comprising a color conversion unit being arranged to use the likelihoods to compute a weighted average color conversion matrix to convert colors to a display color space.

21. At least one non-transitory computer readable medium comprising a plurality of instructions that in response to being executed on a computing device, causes the computing device to operate by:
obtaining image data of at least one image;
forming a plurality of separate data distributions comprising separately applying, to the image data, lens shading correction tables each of a different illuminant of a set of available illuminants;
mapping the data distributions in a chromaticity space;
measuring a compactness of individual ones of the data distributions on the chromaticity space;
generating likelihoods that the individual data distributions are associated with a true illuminant of the image comprising using compactness measurements of the individual data distributions; and
using the likelihoods to correct color on at least one image.

22. The medium of claim 21 wherein the measuring of compactness comprises determining principal components of the data distribution comprising a principal axis and a minor axis, and determining magnitudes of the axes to be used to determine a compactness of a data distribution.

23. The medium of claim 22 wherein the measuring of compactness comprises determining a norm of eigenvalues of a covariance matrix as the magnitudes of the axes.

24. The medium of claim 21 wherein measuring the compactness comprises factoring a human visual system (HVS) comprising favoring data distributions depending on a position or orientation or both of the data distribution relative to a Planckian average chromaticity locus.

25. The medium of claim 21 wherein measuring the compactness comprises factoring at least one of:
(1) an angle between a principal axis of the data distribution and a tangent of a Planckian average chromaticity locus, and
(2) a distance between a point on the data distribution and a point on the Planckian average chromaticity locus.

* * * * *